(12) United States Patent
Takaragi et al.

(10) Patent No.: US 6,341,349 B1
(45) Date of Patent: Jan. 22, 2002

(54) DIGITAL SIGNATURE GENERATING/ VERIFYING METHOD AND SYSTEM USING PUBLIC KEY ENCRYPTION

(75) Inventors: Kazuo Takaragi, Ebina; Hiroyuki Kurumatani, Yokohama, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/961,557

(22) Filed: Oct. 30, 1997

(30) Foreign Application Priority Data

Oct. 31, 1996 (JP) .............................................. 8-290525

(51) Int. Cl.⁷ ................................................ G06F 1/24
(52) U.S. Cl. ............................ 713/168; 380/28; 380/30
(58) Field of Search ............................ 380/30, 28, 25; 713/176

(56) References Cited

U.S. PATENT DOCUMENTS

| | | | | |
|---|---|---|---|---|
| 4,868,877 A | * | 9/1989 | Fischer ........................ | 380/25 |
| 5,005,200 A | * | 4/1991 | Fischer ........................ | 380/30 |
| 5,146,500 A | * | 9/1992 | Maurer ........................ | 380/30 |
| 5,159,632 A | * | 10/1992 | Crandall ..................... | 380/28 |
| 5,231,668 A | * | 7/1993 | Kravitz ........................ | 380/28 |
| 5,272,755 A | * | 12/1993 | Miyaji et al. ................. | 380/30 |
| 5,442,707 A | * | 8/1995 | Miyaji et al. ................. | 380/30 |
| 5,805,703 A | * | 9/1998 | Crandall ..................... | 380/30 |

FOREIGN PATENT DOCUMENTS

| | | |
|---|---|---|
| JP | 0695590 | 4/1994 |
| JP | 6315036 | 11/1994 |
| JP | 7262281 | 10/1995 |

OTHER PUBLICATIONS

Menezes et al. Handbook of Applied Cryptography, CRC Press, Oct. 17, 1996, pp. 454–459.*
Schneier, Bruce, "Applied Cryptography: Protocols, Algorithms, and Source Code in C", Oct. 18, 1995, pp. 496–498.*
Schneier, Bruce. Applied Cryptography: Protocols, Algorithms, and Source Code in C. 2nd ed. Oct. 1995. pp. 429–459.

Horster et al. Meta–ElGamal signature schemes. University of Technology Chemnitz–Zwickau. Dept. of Computer Science. Theoretical Computer Science and Information Security. May 1994. pp. 1–17.

"Telegraph Encryption Method"; Apr. 30, 1953, vol. 7, No. 4, p. 461.

* cited by examiner

Primary Examiner—Thomas R. Peeso
(74) Attorney, Agent, or Firm—Antonelli, Terry, Stout & Kraus, LLP

(57) ABSTRACT

A digital signature generating/verifying method using a public key encryption scheme which ensures high security, reduction in length of the digital signature and independency of the length of the digital signature on that the order of a base point. In generating a digital signature, a first hash value (e) satisfying a condition that e=H(M) is determined for a given message (M) by using a hash function (H), a numerical value (x) is obtained from translation of a random number, a hash value (r) satisfying a condition that r=h(x) is determined by using a hash function (h) whose output value is shorter than that of the first hash function (H), and the digital signature is generated by using the hash values (e) and (r) as determined. For verification of an inputted digital signature, the hash value (e) satisfying the condition that e=H(M) is determined, and for a numerical value (x) obtained from arithmetic operation of a public key (Q), a base point (P) and the inputted digital signature (r, s), a hash value (r') satisfying a condition that r'=h(x) on the basis of the hash value (re), the digital signature (r, s), the base point (P) and the public key (Q) by using a hash function (h) whose output value is shorter than that of the first hash function (H). The hash value (r') is then compared with a tally (r) of the inputted digital signature to thereby verify the inputted digital signature.

25 Claims, 10 Drawing Sheets

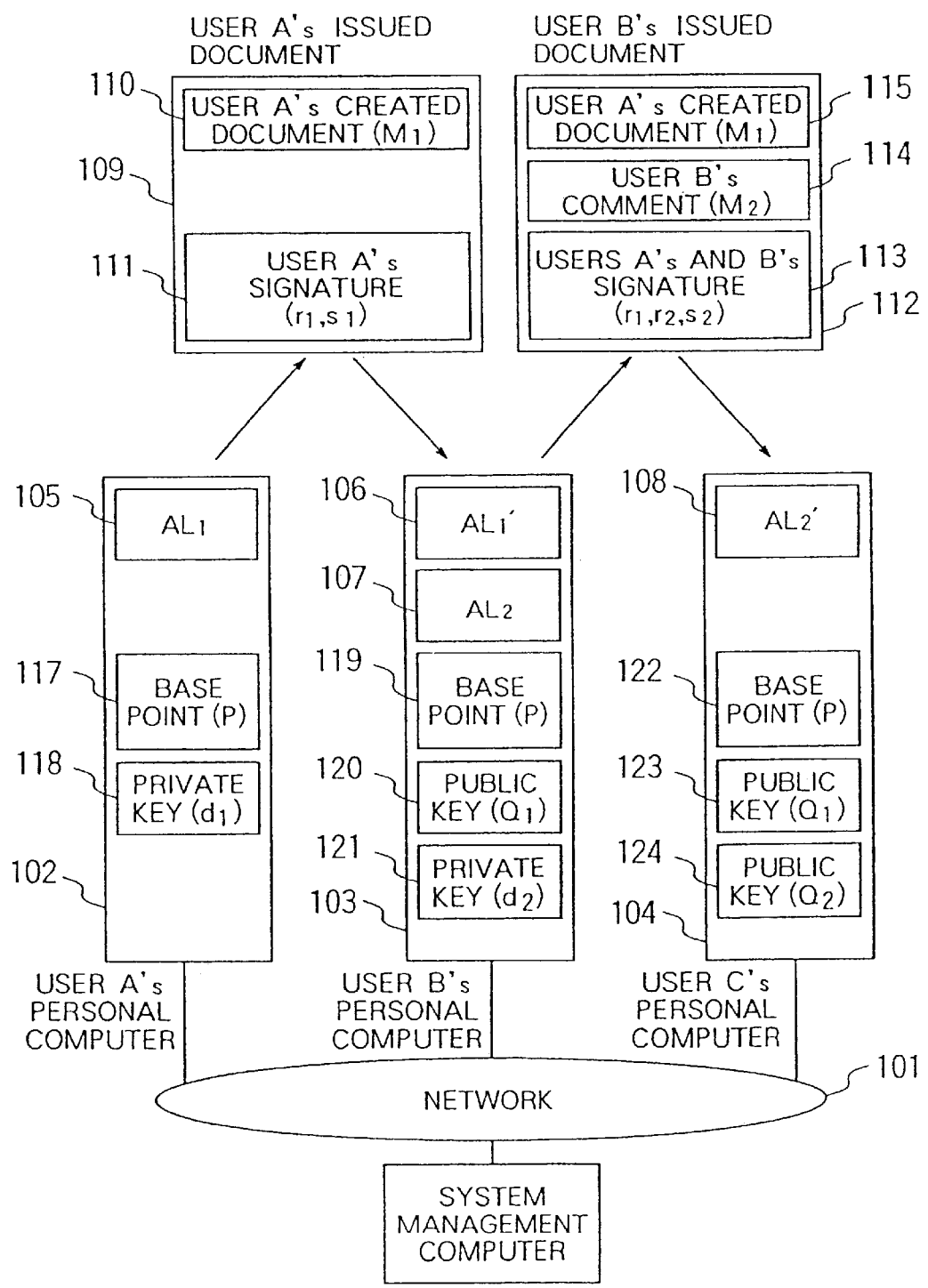

DIGITAL SIGNATURE GENERATING/ VERIFYING METHOD AND SYSTEM USING PUBLIC KEY ENCRYPTION

BACKGROUND OF THE INVENTION

The present invention relates to a method and a system for generating and/or verifying a digital signature by using a public key encryption method for securing the security in a computer network.

The digital signature technology for imparting electric documents or the like for electronic comments or transactions with a function equivalent to that of a conventional seal (hanko in Japanese) promises high efficiency utilization of computer-network system. However, with the conventional electronic mail encryption technology (also known as Privacy Enhanced Mail or PEM in abbreviation), it is impossible to process more than one digital signature for a single enhanced mail. In this conjunction, in the electronic commerce fields, it is expected in the not-so-distant future that the electronic document such as message and the like affixed with a number of digital signatures including not only the digital signature of a purchaser but also those of a distributor, salesman and/or monetary business-man will be handled. Under the circumstances, there arises a demand for the multiple digital signature technology which allows the electronic documents affixed with a plurality of digital signatures to be processed. In this conjunction, it is noted that a person receiving an electronic document affixed with a plurality of digital signatures will be forced to verify the authenticity of plural or N digital signatures written by other persons before writing or generating his or her own single digital signature. Thus, in order to enhance the availability of the digital signature facility in the computer network system, it will be required to increase the speed for verification of the plural (N) digital signatures. Besides, it is conceivable that in the electronic commerces, there is a possibility that comments may be added by a plurality of persons in the course of processing the electronic document.

For having better understanding of the invention, description will first be made in some detail of the technical background of the invention. As a typical one of the digital signature techniques known heretofore, there may be mentioned the public-key cryptography elliptic curve system disclosed in J. Koeller, A. J. Menezes, M. Qu and S. A. Vanstone: "Standard for RSA, Diffie-Hellman and Related Public-Key Cryptography Elliptic Curve Systems (Draft 8)" in "IEEE P1363 Standard" published by the IEEE, May 3, 1996 and May 14, 1996, respectively.

FIG. 9 is a schematic diagram showing generally a configuration of a computer network system in which the techniques disclosed in the above-mentioned literatures are adopted.

Referring to FIG. 9, there are connected to a network 1001 a system manager's computer 1002, a user A's computer 1003 and a user B's computer 1004 for mutual communication.

Operations of the individual units shown in FIG. 9 will be described below.

System Setup

The system manager's computer 1002 is in charge of generating an elliptic curve (E) 1006. Subsequently, a base point (also referred to as the system key) (P) 1007 of the order (n) 1008 is generated and registered in a public file 1005.

Key Generation

A key generating function module 1011 incorporated in the user A's computer 1003 is designed to execute the processing steps which will be mentioned below.

Step 1: In an interval [2, n−2], an integer $d_A$ is selected at random as a private key.

Step 2: A key $Q_A$ is computed in accordance with $Q_A=d_AP$.

Step 3: The key ($Q_A$) 1015 is opened to the public as the public key. More specifically, the public key ($Q_A$) 1015 is transmitted together with the identifier name of the user A to the system manager's computer 1002 via the network 1001, whereon the identifier name of the user A is written in the public file 1005 at a column 1009 for the user A's name with the value of the public key ($Q_A$) 1015 being written in a column 1010 for the public key $Q_A$.

Step 4: In the user A's computer 1003, the value of the private key ($d_A$) 1014 is held as the private key of the user A.

Digital Signature Generation Process

A digital signature generating function module 1033 incorporated in the user A's computer 1003 is designed to execute the processing steps mentioned below.

Step 1: Message (M) 1016 is received.

Step 2: Hash value e=H(M) is computed by using a hash function (H) 1028.

Step 3: Random number $\underline{k}$ is selected from the interval [2, n−2] by using a random number generation function 1029.

Step 4: Point kP=(x, y) is computed by a so-called "scalar multiplication on elliptic curve (E)" 1030.

Step 5: A first tally $\underline{r}$ given by r=x+e (mod n) is determined in accordance with the modular computation "r=x+e (mod n)" 1031.

Step 6: A private key ($d_A$) 1017 is inputted to modular computation process "s=k−$d_A$r (mod n)" 1032 for thereby determining a second tally $\underline{s}$ (=k−$d_A$r (mod n)).

Step 7: A message M 1016 and the digital signature (r, s) 1019 are sent to the user B's computer 1004 via the network 1001.

As the parameters required for the computations performed by the digital signature generating function module 1033, the elliptic curve (E) 1006, the base point which may also be referred to system key (P) 1007 and the order (n) 1008 registered in the public file 1005 held by the system manager's computer 1002 are referenced.

Digital Signature Verification Process

A digital signature verifying function module 1023 incorporated in the user B's computer 1004 is designed to execute the processing steps mentioned below.

Step 1: The user A's public key ($Q_A$) 1010 is fetched from the public file 1005 held by the system manager's computer 1002 to be set as a public key ($Q_A$) 1020. Additionally, the base point (system key) (P) 1007 is fetched from the public file 1005 held by the system manager's computer 1002 to be set as the base point (P) 1007B. Furthermore, the digital signature (r, s) 1019 sent from the user A's computer 1003 is received to be set as a digital signature (r, s) 1021. Besides, the message (M) 1016 sent from the user A's computer 1003 is received to be set as a message (M) 1022.

Step 2: The base point or system key (P) 1007B, the public key ($Q_A$) 1020, the digital signature (r, s) 1021 are inputted to the process "scalar multiplication on elliptic curve (E)" and "addition" 1024 to thereby carry out the calculation "(x, y)=sP+r$Q_A$".

Step 3: The message M 1022 is inputted into the hash function H 1025 to thereby compute the hash value e=H(M).

Step 4: Through the computation process "r'=x+e (mod n)" 1026, a first tally "r'=x+e (mod n)" is determined.

Step 5: When the decision "r=r'?" 1027 results in r=r' or YES, data "authenticated" is outputted, and if otherwise, "not authenticated" is outputted.

As the parameters required for the computations performed by the digital signature verifying function module 1023, the elliptic curve (E) 1006, the base point or system key (P) 1007 and the order (n) 1008 as registered in the public file 1005 held by the system manager's computer 1002 are referenced.

Through the processes described above, the digital signature (r, s) functions as an electronic seal (i.e., seal or "hanko" impressed electronically by the user A for the message M). To say in another way, the user B can hold the set of the message M and the digital signature (r, s) as the evidence indicating that the message M is issued by the user A. Further, although the user B can recognize the authenticity of the set of the message M and the digital signature (r, s), the user B can not originally generate the set of the message M and the digital signature (r, s). For this reason, the user A can not negate later on the fact that the digital signature (r, s) has been generated by the user A.

However, the conventional system described above suffers the problems which will be elucidated below.

(1) Insufficient Proof for Security

In general, generation of a digital signature by a person having no private key provides a problem. If otherwise, the authenticity of the digital signature can not be ensured, degrading the creditability of the electronic commerce and rendering it impractical.

In the conventional system described above, it is required to provide that such tally combination (r, s) can not be generated which allows the output "authenticated" to be generated in the course of the digital signature verification processing without knowing the private key $d_A$. However, the conventional system provides no proof to this end. Parenthetically, it should be mentioned that the problem mentioned above has been pointed out in conjunction with ElGamal signature technology on which the conventional system described above is based.

(2) Long bit length of the digital signature

Now, assuming that relevant parameters have respective bit lengths as follows:

(a) The bit length representing the order $\underline{n}$ of the base point P is $l_n$ bits (e.g. 160 bits).

(b) The bit length representing the output of the hash function H is $l_H$ bits (e.g. 160 bits).

(c) The bit length of the private key $d_A$ is $l_d$ bits (e.g. 160 bits).

The output value of the hash function H given by of 160 bits is considered as being necessary in view of the fact that the hash function H has a collision-free property. In this conjunction, it is contemplated with the phrase "collision-free property" to mean that difficulty is encountered in finding two different input values which result in a same output value in view of the computational overhead. By way of example, in the case where the output value of a hash function H is 160 bits, it will be possible to find two different input values which results in a same output value by carrying out an attack method known as "Paradox of Birthday" a number of times on the order of $2^{80}$ on an average, which is however difficult in view of the computational overhead.

Further, the bit length of 160 bits for the order $\underline{n}$ of the base point (system key) is considered as being necessary because of difficulty of solving the discrete logarithm problem relevant to the addition on the elliptic curve.

In this case, when the length of the tally $\underline{r}$ of the digital signature (r, s) is of $l_n$ bits with the length of the tally $\underline{s}$ being of $l_n$ bits, then the total bit number amounts to $(l_n+l_n)$ bits (e.g. 320 bits).

(3) The length of the digital signature is determined in dependence on the length of the parameter $\underline{n}$ of the elliptic curve. Consequently, when the length of the parameter $\underline{n}$ is increased for ensuring the security of the digital signature more positively in the future, the length of the digital signature increases correspondingly. Parenthetically, in conjunction with RSA and EES, it is noted that the length of the parameter $\underline{n}$ is unavoidably increased because of enhancement of the decryption method and the computer performance promoted as a function of the time lapse. The same will also apply equally to the elliptical encryption in the future. To say in another way, it is expected that the length of the parameter $\underline{n}$ will necessarily increase as the decryption technology and the computer performance are enhanced as a function of time lapse. Such being the circumstances, it is desirable in conjunction with the elliptic encryption to realize the digital signature which does not depend on the length of the order $\underline{n}$ of the base point or system key P.

SUMMARY OF THE INVENTION

In the light of the state of the art described above, it is an object of the present invention to provide a digital signature generating and/or verifying method and system using a public key encryption scheme with high security as well as a recording medium for storing a program for carrying out the method.

Another object of the present invention is to provide a digital signature generating and/or verifying method and system using a public key encryption scheme, which allows the bit length of the digital signature to be shortened, and a recording medium for storing a program realizing the same.

Yet another object of the present invention is to provide a digital signature generating/verifying method and system which are based on the use of a public key encryption method in which the length of the digital signature is made to be independent of the length of the order of the base point, and a recording medium employed for storing a program realizing the same.

In view of the above and other objects which will become apparent as the description proceeds, there is provided according to a first generic aspect of the present invention a digital signature generating/verifying method of generating and/or verifying a digital signature authenticating electronically a signature affixed to a given document or message (M) by resorting to a public key encryption scheme. The digital signature generating/verifying method includes processing steps of determining for the given document or message (M) a hash value (e) satisfying a condition that e=H(M) by using a hash function (H), and determining for a numerical value (x) derived from translation of a random number a hash value (r) satisfying a condition that r=h(x) by using a hash function (h) whose output value is shorter than that of the first-mentioned hash function (H).

Further, according to another general aspect of the present invention, there is provided a digital signature generating and/or verifying method of generating or verifying a multiple digital signature authenticating electronically signatures affixed to document such as messages and/or comments ($M_i$) as created and/or added sequentially by N users $\underline{i}$ (where i=1, ..., N) by using a public key encryption scheme. The digital signature generating/verifying method includes the steps of (a) determining for a given one of the messages ($M_i$) a hash value ($e_i$) satisfying a condition that $e_i$=H($M_i$) by using a hash function (H), (b) determining for a numerical value ($x_i$) obtained from translation of a random number a hash value ($r_i$) satisfying a condition that $r_i$=h($x_i$) by using a hash function (h) whose output value is shorter than that of the first-mentioned hash function (H) and (c)

executing the above-mentioned steps (a) and (b) for each of the users i (where i=1, . . . , N).

According to another general aspect of the present invention, there is provided a digital signature generating/verifying system for generating a digital signature authenticating electronically a signature affixed to a given message (M) by resorting to a public key encryption scheme. The digital signature generating/verifying system is composed of a processing unit for determining for the message (M) a hash value (e) satisfying a condition that e=H(M) by using a hash function (H), a processing unit or module for determining for a numerical value (x) obtained from translation of a random number a hash value (r) satisfying a condition that r=h(x) by using a hash function (h) whose output value is shorter than that of the hash function (H).

Furthermore, according to another general aspect of the present invention, there is provided a digital signature generating and/or verifying system for generating and/or verifying a multiple digital signature authenticating electronically signatures affixed to document such as messages and/or comments ($M_i$) as created and/or added sequentially by N users i (where i=1, . . . , N) by resorting to the use of a public key encryption scheme, wherein the digital signature generating/verifying system includes a module for determining for a given one of the messages ($M_i$) a hash value ($e_i$) satisfying a condition that $e_i$=H($M_i$) by using a hash function (H), a module for determining for a numerical value ($x_i$) derived from translation of a random number a hash value ($r_i$) satisfying a condition that $r_i$=h($x_i$) by using a hash function (h) whose output value is shorter than that of the first-mentioned hash function (H), and a module for validating the above-mentioned modules for each of the users i (where i=1, . . . , N).

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a schematic block diagram showing generally a system configuration according to an exemplary embodiment of the present invention;

DESCRIPTION OF THE PREFERRED EMBODIMENTS

Figure 2A:
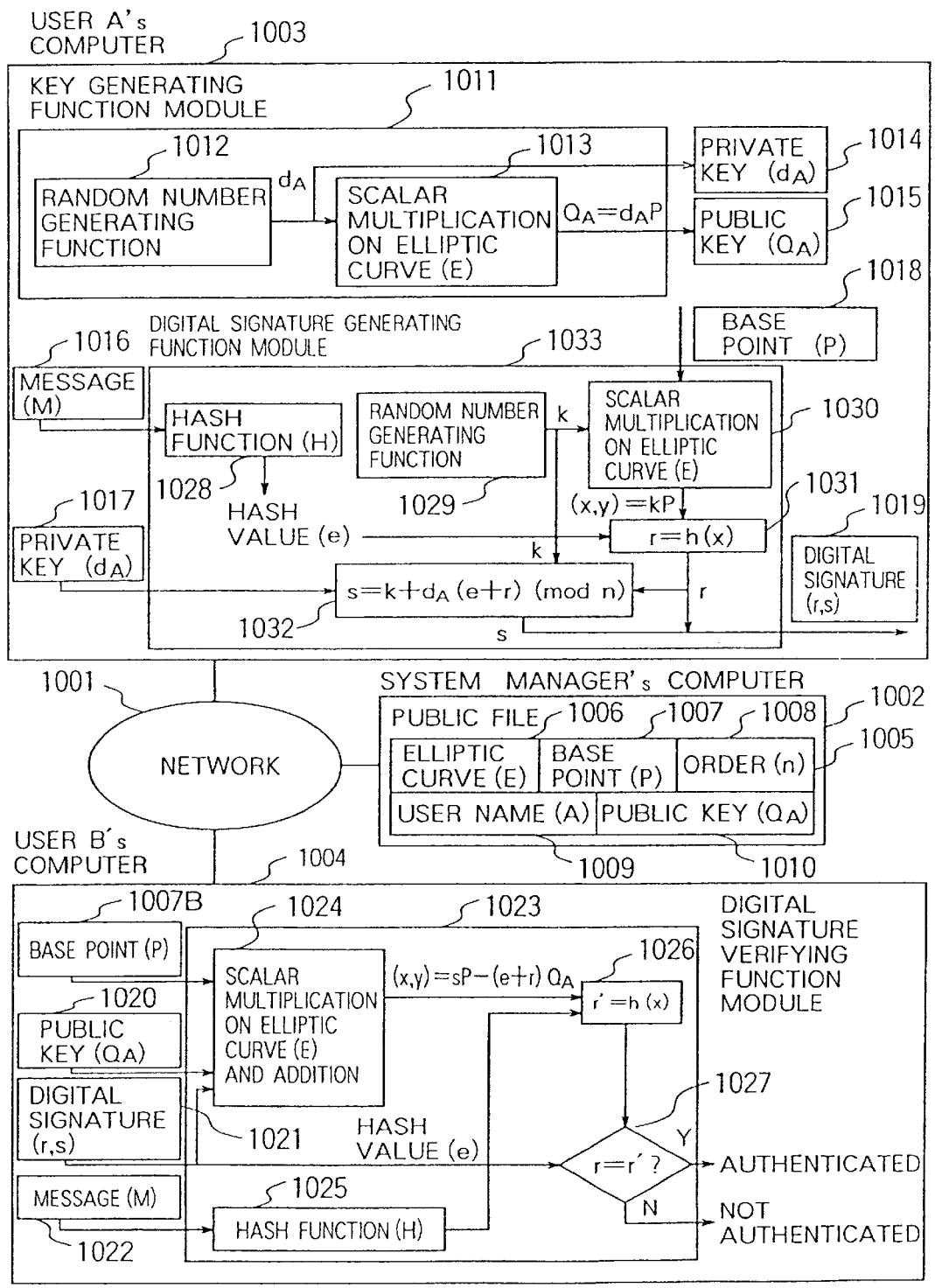
FIG. 2A is a block diagram showing a system configuration of a single digital signature generating/verifying unit executed by a user A's personal computer shown in FIG. 1.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "document", "comment", "message" and the like are words of convenience and are not to be construed as limiting terms.

FIG. 1 is a schematic block diagram showing generally a system configuration according to an exemplary embodiment of the invention. Referring to the figure, there are connected to a network 101, a user A's personal computer 102, a user B's personal computer 103 and a user C's personal computer 104. In the user A's personal computer 102, a user A's signature ($r_1$, $s_1$) 111 is generated for a user A's created document ($M_1$) 110 by using a base point which may also be referred to as the system key (P) 117 and a user A's private key ($d_1$) 118 in accordance with a single digital signature generation algorithm ($AL_1$) 105 to be subsequently sent to the user B's personal computer 103 via the network 101. In this conjunction, "$r_1$" and "$s_1$" of the user A's signature ($r_1$, $s_1$) 111 are defined as a first tally and a second tally, respectively. In the user B's personal computer 103, authenticity of the user A's issued document 109 composed of a set of the user A's created document ($M_1$) 110 and the user A's signature ($r_1$, $s_1$) 111 is verified by using a base point or system key (P) 119 and a user A's public key ($Q_1$) 120 in accordance with a single digital signature verification algorithm ($AL_1'$) 106 and at the same time, a user A's and B's multiple signature ($r_1$, $r_2$, $s^2$) 113 is generated for the user A's created document ($M_1$) (i.e., document $M_1$ created by user A) 115, the user A's signature ($r_1$, $s_1$) 111 and a user B's addition such as comment ($M_2$) 114 by using the base point (P) 119 and the user B's private key ($d_2$) 121 in accordance with a duple digital signature generation algorithm ($AL_2$) 107 to be subsequently sent to the user C's personal computer 104 via the network 101. In the user C's personal computer 104, authenticity of the user B's issued document 112 composed of the set of the user A's created document ($M_1$) 115 and the user B's addition or comment ($M_2$) 114 as well as the user A's and B's multiple (duple) signature ($r_1$, $r_2$, $s_2$) 113 is verified by using the base point (P) 122, a user A's public key ($Q_1$) 123 and a user B's public key ($Q_2$) 124 in accordance with a duple digital signature verification algorithm ($AL_2'$) 108.

Figure 2B:
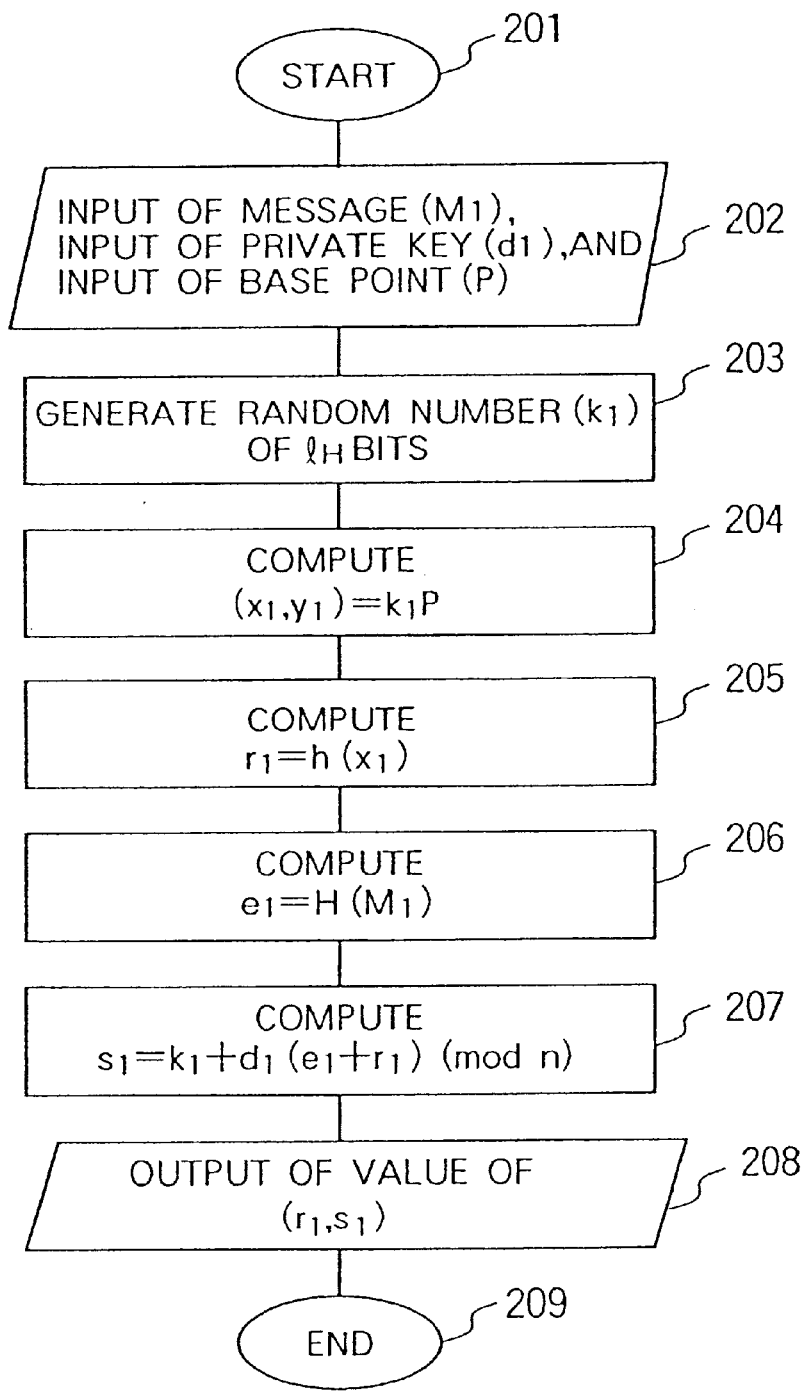
FIG. 2B is a flow chart for illustrating a processing involved in the single digital signature generation algorithm executed by the user A's personal computer in conjunction with the system shown in FIG. 1.

FIG. 2A is a block diagram showing a system configuration of the single digital signature generation/verification system shown in FIG. 1 and FIG. 2B is a flow chart for illustrating the processing for the single digital signature generation algorithm ($AL_1$) 105 mentioned previously in conjunction with the system shown in FIG. 1. Description will now be made by reference to FIGS. 2A and 2B.

Figure 9:
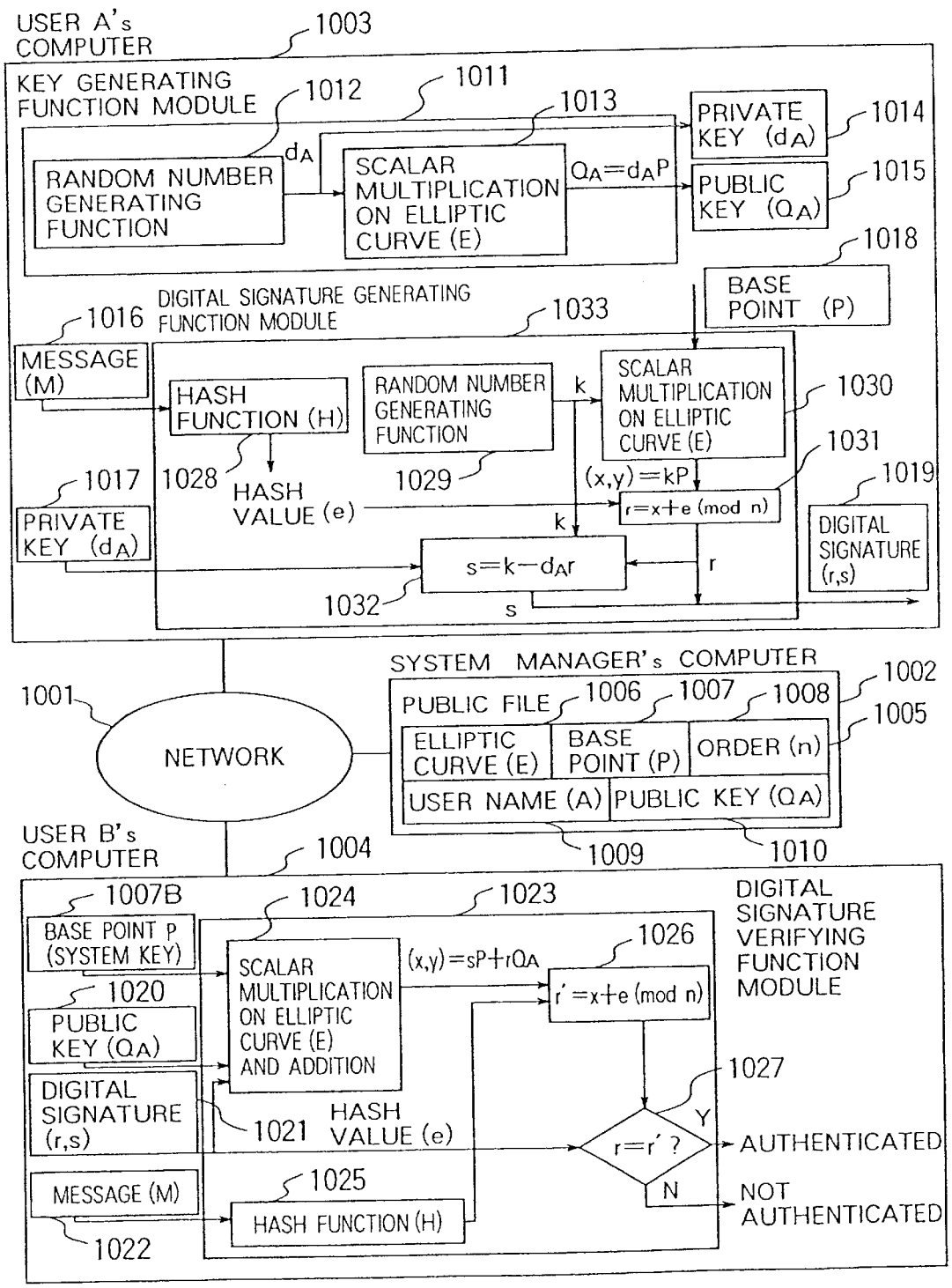
FIG. 9 is a schematic diagram showing generally a configuration of a conventional computer network system designed for transferring electronic documents affixed with digital signatures known heretofore.

The system configuration shown in FIG. 2A bears correspondence to the one shown in FIG. 9. It can be seen that the former differs from the latter in respect to the algorithm in the digital signature generating blocks 1031 and 1032, the algorithm in the digital signature verifying block 1026 and the output algorithm in the block 1024.

Single Digital Signature Generation Algorithm (AL$_1$) 105

Step 201: Processing for executing this algorithm (AL$_1$) 105 is started.

Step 202: The user A's created document (M$_1$) 110, the base point (P) 117 and the user A's private key (d1) 118 are inputted.

Step 203: A random number $k_1$ of $l_H$ bits is generated.

Step 204: Computation is performed for determining $k_1P = (x_1, y_1)$.

Step 205: Hash value $r_1$ (=$h(x_1)$) of $l_H/2$ bits is computed.

Step 206: Hash value $e_1$ (=$H(M_1)$) of $l_H$ bits is computed.

Step 207: Computation is performed for determining a tally $s_1$ in accordance with $s_1=k_1+d_1(e_1+r_1)$ (mod n).

Step 208: value of the single digital signature $(r_1, s_1)$ 111 is outputted.

Step 209: The processing is terminated.

The single digital signature generated through the processing described above corresponds to an electronic image of a seal ("hanko" in Japanese) impressed on the message M$_1$ by the user A. In other words, the single digital signature $(r_1, s_1)$ can be generated only when the private key $d_1$ equivalent to the seal kept only by the user A is used for the message M$_1$ as furnished.

Figure 3:
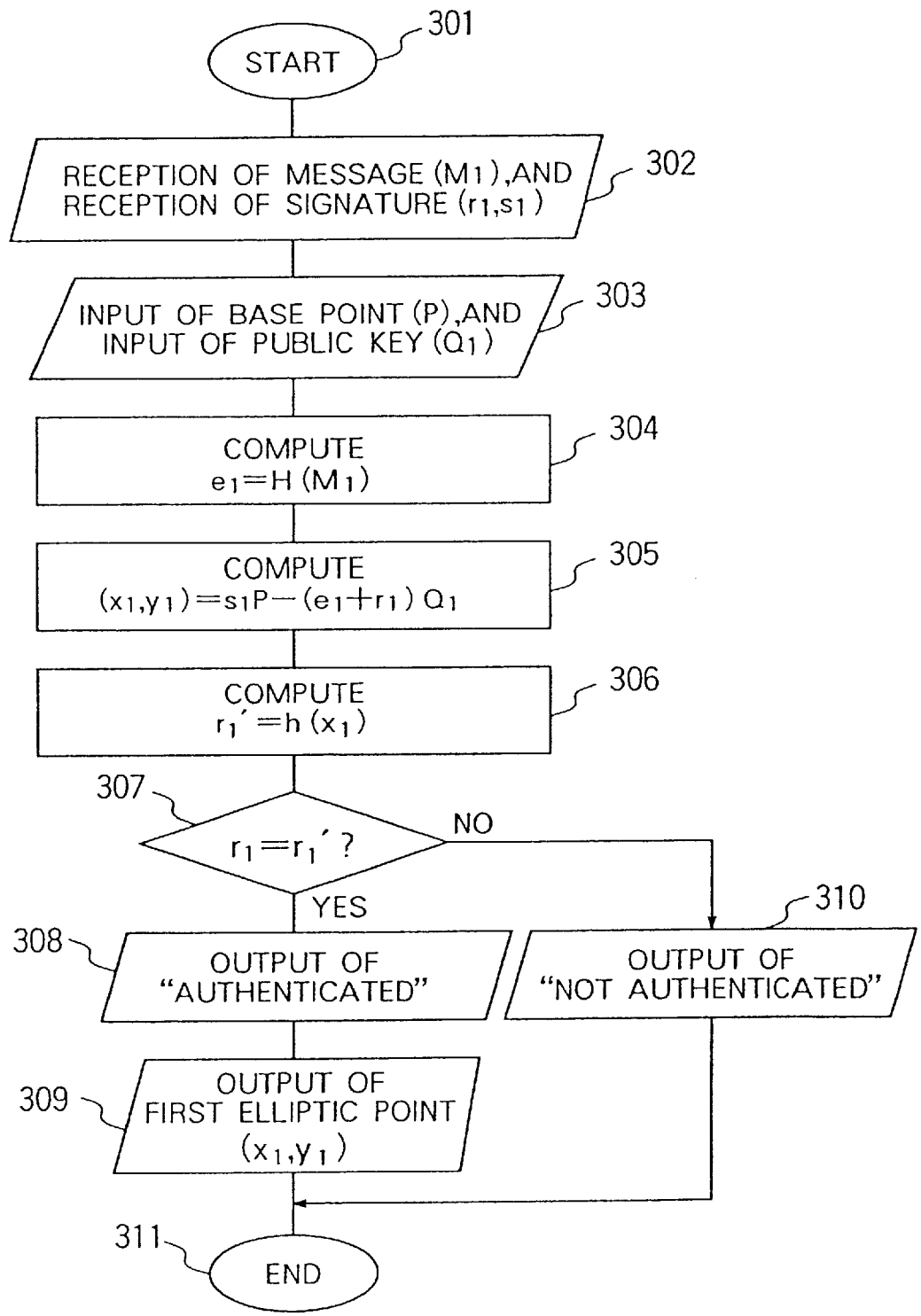
FIG. 3 is a flow chart for illustrating a processing for a single digital signature verification processing or algorithm executed by a user B's personal computer in the system shown in FIG. 1.

FIG. 3 is a flow chart for illustrating a processing for the single digital signature verification algorithm (AL$_1$') 106 in conjunction with the system shown in FIG. 1. Description will now be made by reference to FIG. 3.

Single Digital Signature Verification Algorithm (AL$_1$') 106

Step 301: Processing is started.

Step 302: The user A's created document (M$_1$) 110 and the single digital signature $(r_1, s_1)$ 111 is inputted.

Step 303: The system key (P) 119 and the public key (Q$_1$) 120 are inputted.

Step 304: Hash value $e_1=H(M_1)$ of $l_H$ bits is computed.

Step 305: Computation is performed for determining a first point on an elliptic curve, i.e., a first elliptic point $(x_1, y_1)=s_1P-(e_1+r_1)Q_1$.

Step 306: A numeric value $r_1'=h(x_1)$ is computed.

Step 307: When the condition that $r_1=r_1'$ is met, the processing proceeds to a step 308 while if otherwise to a step 310.

Step 308: A signal or data "authenticated" is outputted. Step 309: The first elliptic point $(x_1, y_1)$ is outputted, whereon the processing proceeds to a step 311.

Step 310: "Not authenticated" is outputted.

Step 311: The processing is then terminated.

Through the processing described above, it can be confirmed whether or not the single or simple digital signature $(r_1, s_1)$ is a correct signature, i.e., whether or not the single digital signature $(r_1, s_1)$ corresponds to the correct or true seal image. More specifically, upon reception of the message M$_1$ and the single or simple digital signature $(r_1, s_1)$, the user B (or user B's computer) checks to confirm the authenticity of the digital signature by referencing the public key Q$_1$ which corresponds to the registered seal ("hanko").

Figure 4:
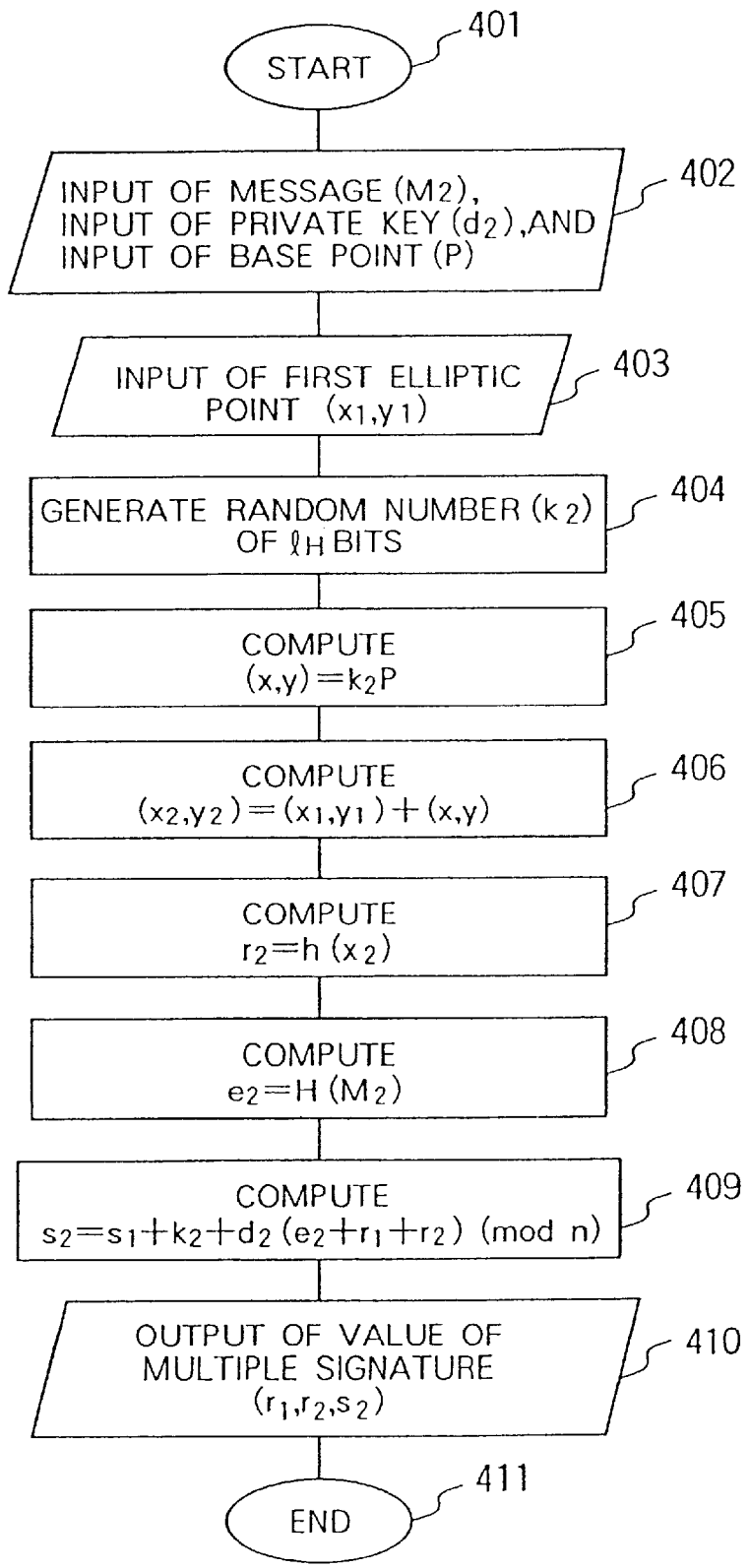
FIG. 4 is a flow chart for illustrating a processing for a duple digital signature generation processing or algorithm executed by the user B's personal computer in the system shown in FIG. 1.

FIG. 4 is a flow chart for illustrating a processing for the duple digital signature generation algorithm (AL$_2$) 107 in conjunction with the system shown in FIG. 1. Description will now be made by reference to FIG. 4.

Duple Digital Signature Generation Algorithm (AL$_2$) 107

Step 401: Processing is started.

Step 402: User B's addition or comment (M$_2$) 114, the base point (or system key) (P) 119 and the user B's private key (d$_2$) 121 are inputted.

Step 403: The first point $(x_1, y_1)$ on the elliptic curve outputted in the step 309 is fetched.

Step 404: A random number $k_2$ of $l_H$ bits is generated.

Step 405: A point $(x, y)=k_2P$ is computed.

Step 406: A second point $(x_2, y_2)=(x_1, y_1)+(x, y)$ is computed.

Step 407: Hash value $r_2=h(x_2)$ of $l_H/2$ bits is computed.

Step 408: Hash value $e_2=H(M_2)$ of $l_H$ bits is computed.

Step 409: Computation for determining a tally given by $s_2=s_1+k_2+d_2(e_2+r_1+r_2)$ (mod n) is performed.

Step 410: Value of the duple digital signature $(r_1, r_2, s_2)$ 113 is outputted.

Step 411: The processing comes to an end.

The duple digital signature $(r_1, r_2, s_2)$ generated through the processing described above corresponds to the seal image impressed on a whole document prepared by adding the user B's comment or addition (M$_2$) 114 to the message (M$_1$) 110 created by the user A and affixed with the single digital signature $(r_1, s_1)$ 111. More specifically, when the message M$_1$ created by other person (user A) and affixed with the other person's single digital signature or the user A's single digital signature $(r_1, s_1)$ in the case of the illustrated example is received by the user B and when the user B wants to add the comment M$_2$, the duple digital signature $(r_1, r_2, s_2)$ is generated, which indicates that the seal is impressed for the whole document by using the private key $d_2$ corresponding to the seal which only the user B possesses.

Figure 5:
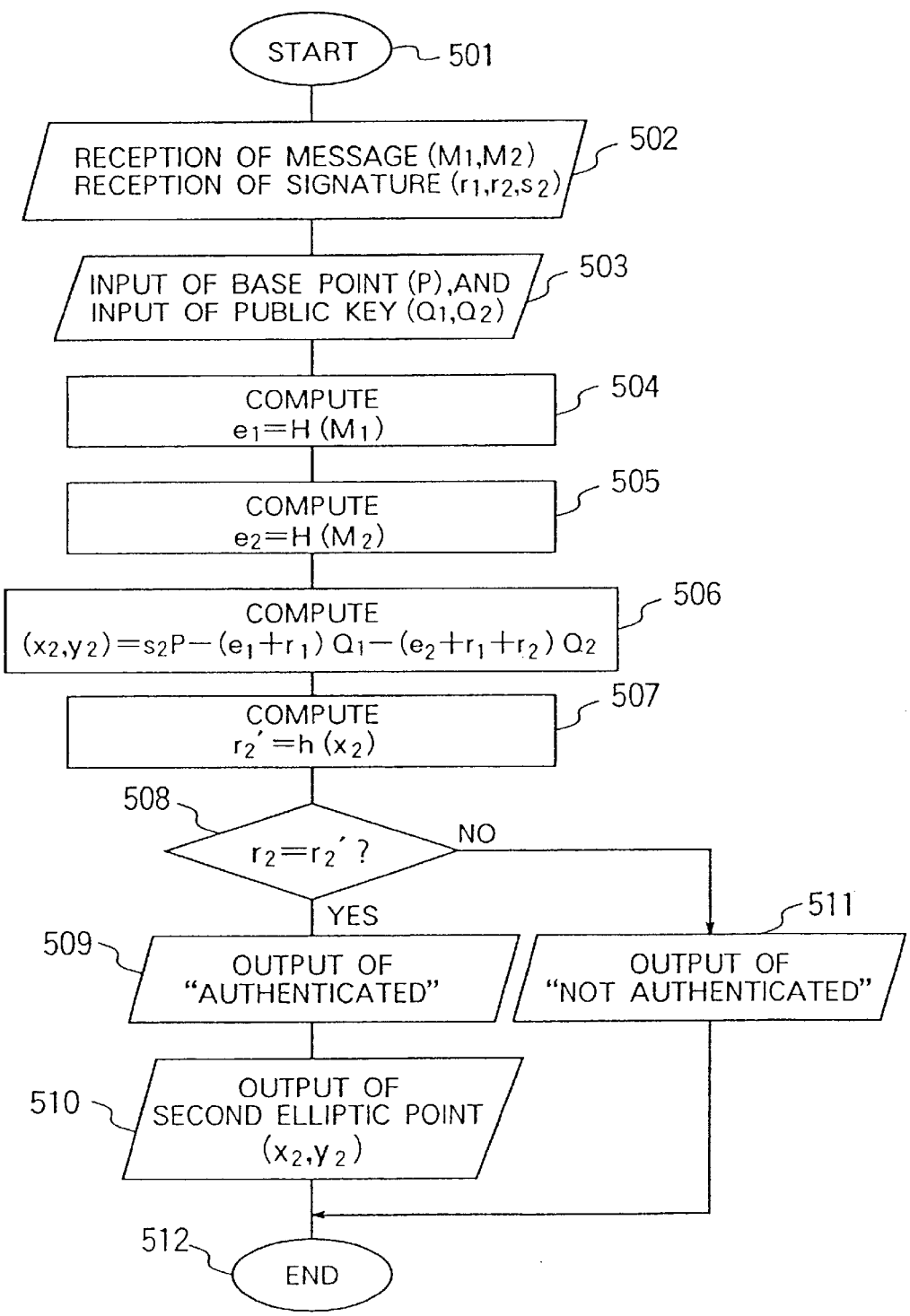
FIG. 5 is a flow chart for illustrating a processing for a duple digital signature verification processing or algorithm executed by a user C's personal computer in the system shown in FIG. 1.

FIG. 5 is a flow chart for illustrating a processing for a duple digital signature verification algorithm (AL$_2$') 108 in conjunction with the system shown in FIG. 1. Description will now be made by reference to FIG. 5.

Duple Digital Signature Verification Algorithm (AL$_2$') 108

Step 501: Processing is started.

Step 502: The user A's created document (M$_1$) 115, the user B's added comment or addition (M$_2$) 114, and the duple digital signature $(r_1, r_2, s_2)$ 113 are inputted.

Step 503: The base point or system key (P) 122, the user A's public key (Q$_1$) 123 and the user B's public key (Q$_2$) 124 are inputted.

Step 504: A hash value $e_1=H(M_1)$ of $l_H$ bits is computed.

Step 505: A hash value $e_2=H(M_2)$ of As bits is computed.

Step 506: A second elliptic point given by $(x_2, y_2)=s_2P-(e_1+r_1)Q_1-(e_2+r_1+r_2)Q_2$ is computed.

Step 507: A numerical value $r_2'=h(x_2)$ is computed.

Step 508: When $r_2=r_2'$, the processing proceeds to a step 509, and if otherwise, to a step 511.

Step 509: A signal "authenticated" is outputted.

Step 510: The second elliptic point $(x_2, y_2)$ is outputted, whereon the processing proceeds to a step 512.

Step 511: A signal or data "not authenticated" is outputted.

Step 512: The processing comes to an end.

Through the processing described above, it is confirmed whether or not the duple digital signature $(r_1, r_2, s_2)$ is a correct signature, i.e., whether or not the duple digital signature $(r_1, r_2, s_2)$ corresponds to the correct or true seal image. More specifically, upon reception of the message $M_1$, message $M_2$ and the duple digital signature ($r_1$, $r_2$, $s_2$), the user C checks to confirm that the digital signature is made authentically by the very users A and B by referencing the public keys $Q_1$ and $Q_2$ which correspond to the registered seals. In that case, the user C can confirm the authenticity of the digital signature without using either the private key $d_1$ corresponding to the user A's seal or the private key $d_2$ corresponding to the user B's seal.

In the foregoing, generation of the duple digital signature by using two private keys $d_1$ and $d_2$ has been described as an exemplary embodiment of the invention. In this conjunction, it should be mentioned that the principle underlying the digital signature generating/verifying method described above can be extended in general for the generation of an N-tuple digital signature generated by using N private keys $d_1, d_2, \ldots, d_N$.

Figure 6:
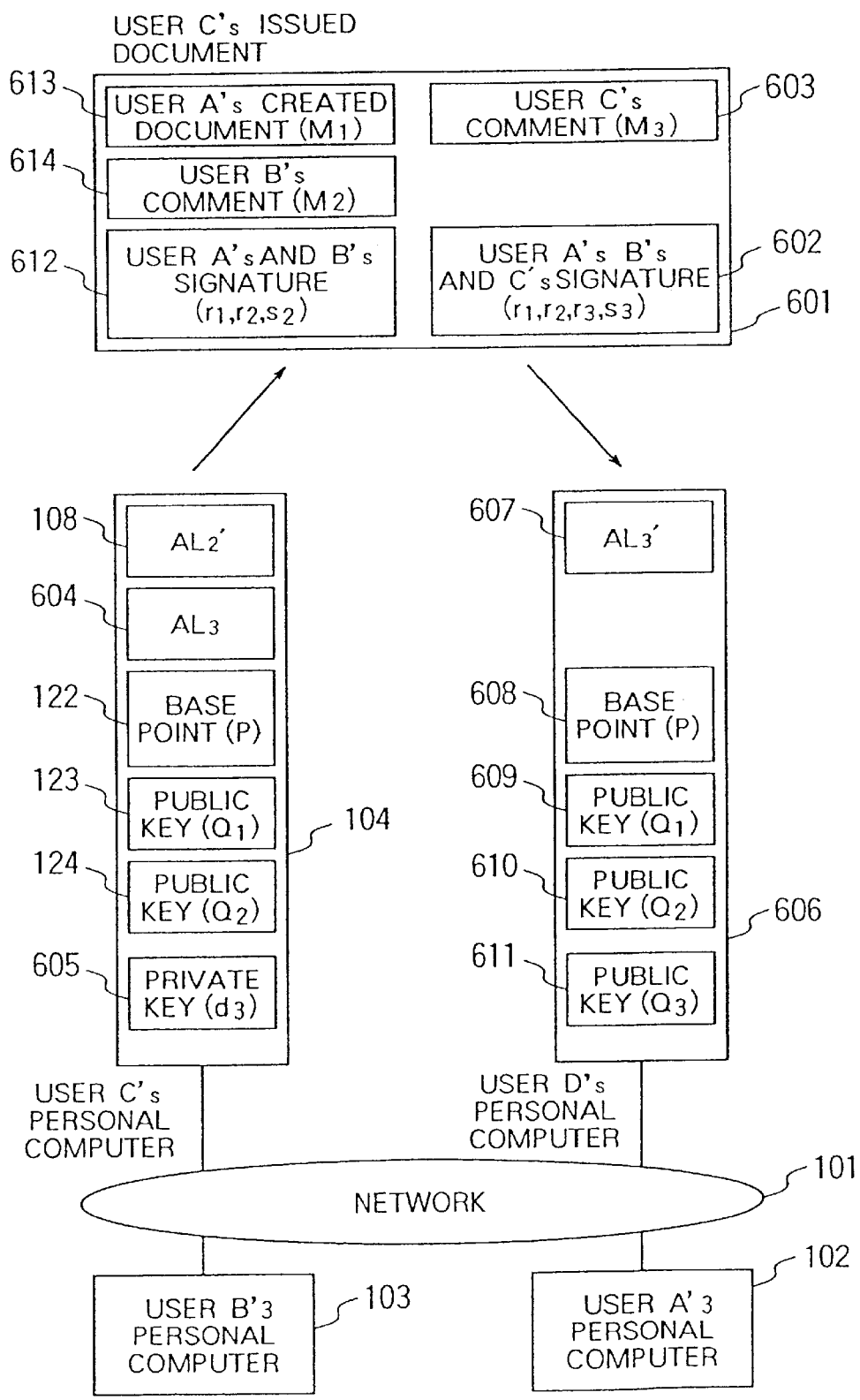
FIG. 6 is a block diagram showing a computer network configuration according to another embodiment of the invention.

FIG. 6 is a block diagram showing a computer network configuration according to another embodiment of the invention on the assumption that the system is expanded so as to enable triple digital signatures, i.e., N=3. Referring to the figure, there are newly connected to the network 101, a user D's personal computer 606 in addition to the user A's personal computer 102, the user B's personal computer 103 and the user C's personal computer 104. Set up newly in the user C's personal computer 104 in addition to the dual digital signature verification algorithm ($AL_2'$) 108, the system key or base point (P) 122, the user A's public key ($Q_1$) 123 and the user B's public key ($Q_2$) 124 are a triple digital signature generation algorithm ($AL_3$) 604 and a user C's private key ($d_3$) 605. The user C's personal computer 104 creates a user C's issued document 601 and sends it to the user D's personal computer 606. The user C's issued document 601 contains newly a user C's addition or comment ($M_3$) 603 and users A's, B's and C's signatures ($r_1$, $r_2$, $r_3$, $s_3$) 602 in addition to the user A's created document ($M_1$) 613, the user B's addition such as a comment ($M_2$) 614 and a user A's and B's signatures ($r_1$, $r_2$, $s_2$) 612. Set up in the user D's personal computer 606 are a triple digital signature verification algorithm ($AL_3'$) 607, a base point (P) 608, the user A's public key ($Q_1$) 609, the user B's public key ($Q_2$) 610 and the user C's public key ($Q_3$) 611.

Figure 7:
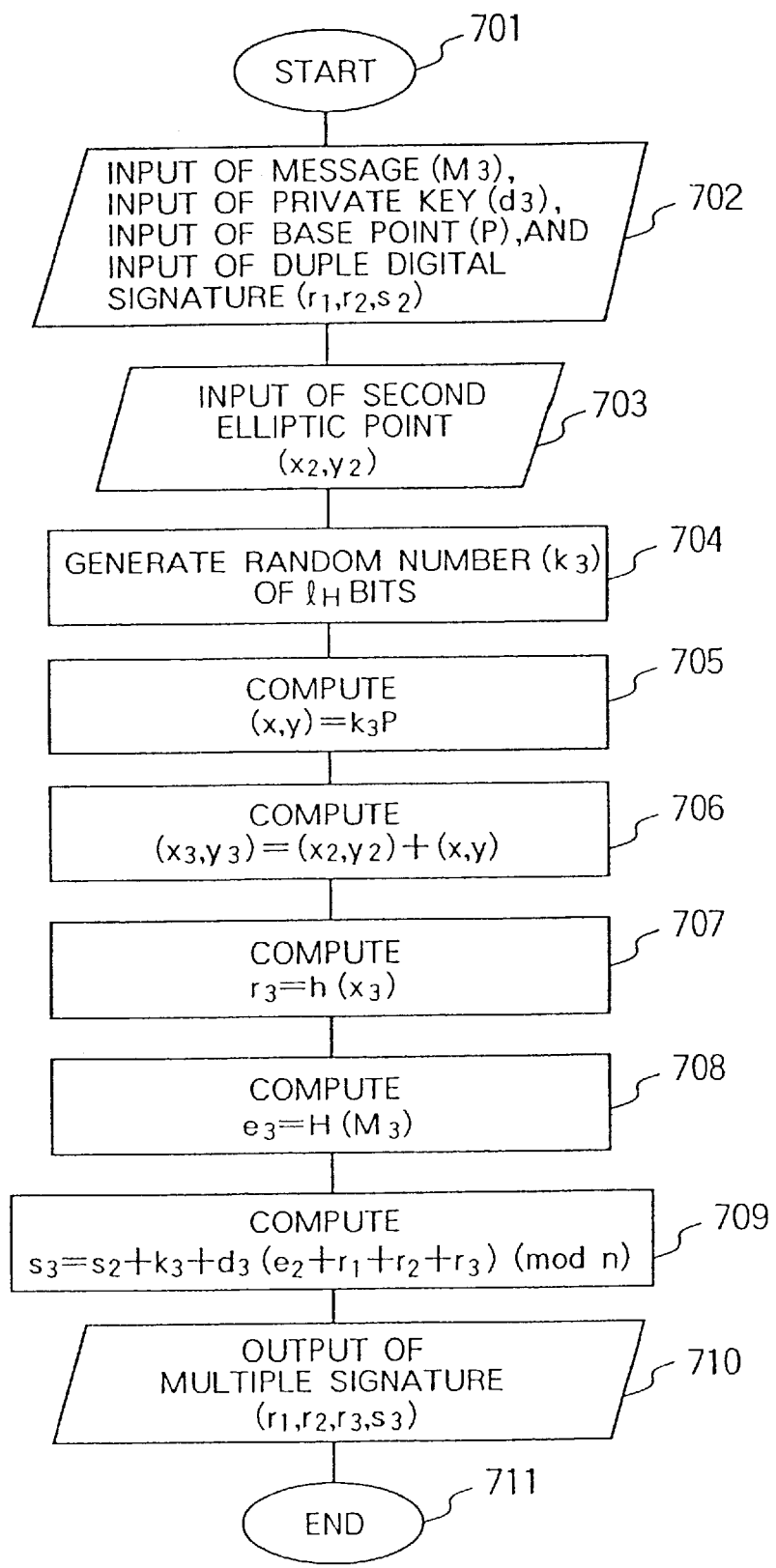
FIG. 7 is a flow chart for illustrating a processing for a triple digital signature generation algorithm executed by the user C's personal computer shown in FIG. 6.

FIG. 7 is a flow chart for illustrating a processing for the triple digital signature generation algorithm ($AL_3$) 604 executed by the user C's personal computer 104 shown in FIG. 6.

Triple Digital Signature Generation Algorithm
($AL_3$) 604

Step 701: Processing is started.
Step 702: The user C's addition or comment ($M_3$) 603, the private key ($d_3$) 605, the base point (P) 122 and the duple digital signature ($r_1$, $r_2$, $s_2$) 612 are inputted.
Step 703: Second elliptic point ($x_2$, $y_2$) outputted in the step 510 is fetched.
Step 704: A random number $k_3$ of $l_H$ bits is generated.
Step 705: A point $k_3P=(x, y)$ is computed.
Step 706: Coordinates ($x_3$, $y_3$)=($x_2$, $y_2$)+($x$, $y$) are computed.
Step 707: A hash value $r_3=h(x_3)$ of $l_H/2$ bits is computed.
Step 708: A hash value $e_3=H(M_3)$ of $l_H$ bits is computed.
Step 709: A tally $s_3=s_2+k_3+d_3(e_3+r_1+r_2+r_3)$ (mod n) is computed.
Step 710: Value of the triple digital signature ($r_1$, $r_2$, $r_3$, $s_3$) 602 is outputted.
Step 411: The processing is terminated.

The triple digital signature ($r_1$, $r_2$, $r_3$, $s_3$) generated through the processing described above corresponds to the seal image impressed on a whole document obtained by adding the user C's comment or addition $M_3$ to the messages $M_1$ and $M_2$ affixed with the users A and B's multiple digital signatures ($r_1$, $r_2$, $s_2$). More specifically, when the messages $M_1$ and $M_2$ affixed with other users' multiple digital signature (i.e., the users A's and Bs' multiple digital signatures in the case of the illustrated example) ($r_1$, $r_2$, $s_2$) are received by a user (i.e., user C) and when the user C wants to add the comment $M_3$, the triple digital signature ($r_1$, $r_2$, $r_3$, $s_3$) can be generated for the whole document created by the users A and B and added with the comment $M_3$ by the user C only by using a private key $d_3$ corresponding to the seal which only the user C possesses.

Figure 8:
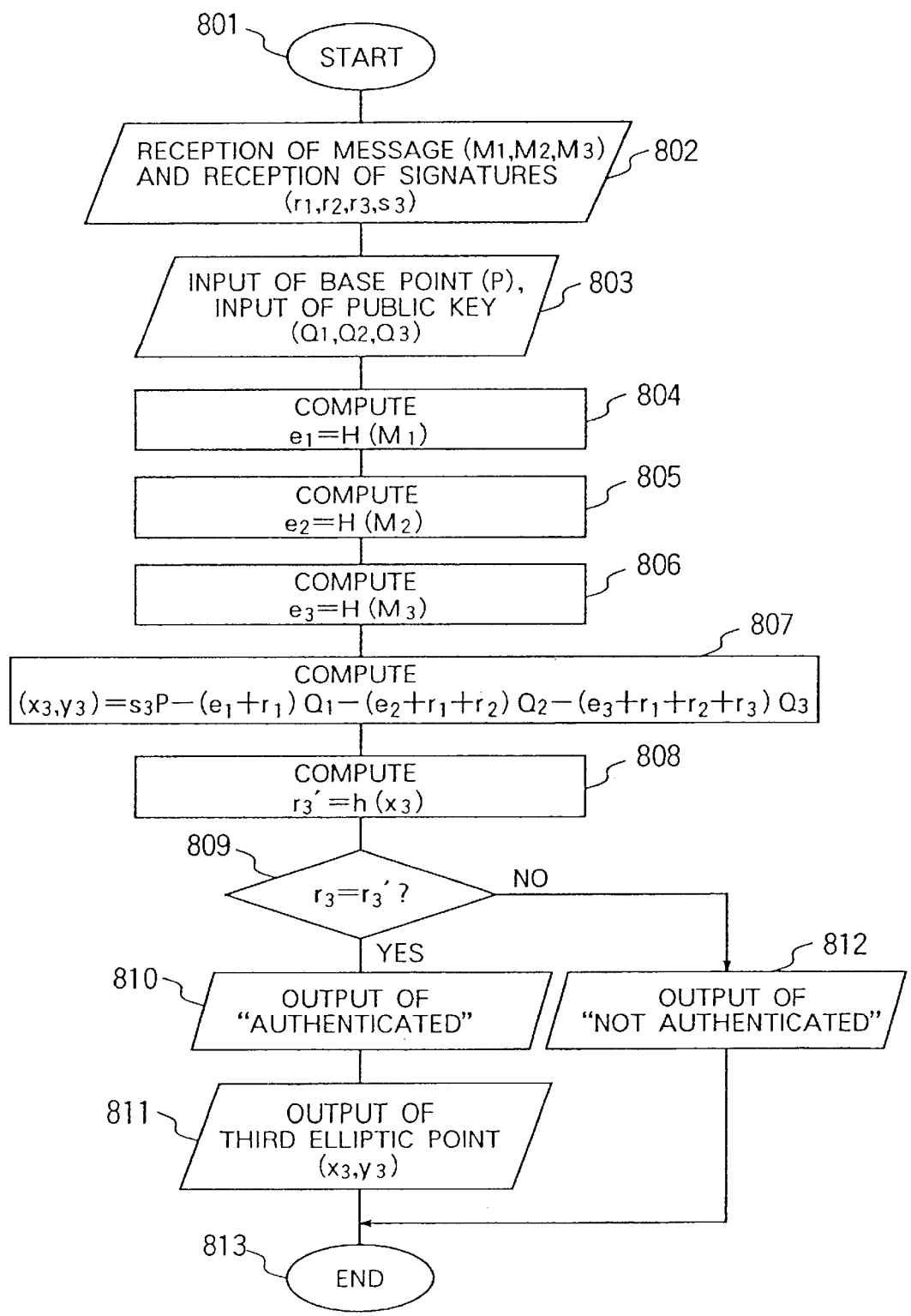
FIG. 8 is a flow chart for illustrating a processing for a triple digital signature verification algorithm executed by a user D's personal computer in the system shown in FIG. 6.

FIG. 8 is a flow chart for illustrating a processing for the triple digital signature verification algorithm ($AL_3'$) 607 executed by the user D's personal computer 606 in conjunction with the system shown in FIG. 6. Description will now be made by reference to FIG. 8.

Triple Digital Signature Verification Algorithm
($AL_3'$) 607

Step 801: Processing is started.
Step 802: The user A's created document ($M_1$) 613, the user B's addition or comment ($M_2$) 614, the user C's addition or comment ($M_3$) 603 and the triple digital signature ($r_1$, $r_2$, $r_3$, $s_3$) 602 is inputted.
Step 803: The base point (P) 608, the user A's public key ($Q_1$) 609, the user B's public key ($Q_2$) 610 and the user C's public key ($Q_3$) 611 are inputted.
Step 804: A hash value $e_1=H(M_1)$ of $l_H$ bits is computed.
Step 805: A hash value $e_2=H(M_2)$ of $l_H$ bits is computed.
Step 806: A hash value $e_3=H(M_3)$ of $l_H$ bits is computed.
Step 807: A third point on the elliptic curve, i.e., a third elliptic point ($x_3$, $y_3$)=$s_3P-(e_1+r_1)Q_1-(e_2+r_1+r_2)Q_2-(e_3+r_1+r_2+r_3)Q_3$ is computed.
Step 808: Tally $r_3'=h(x_3)$ is computed.
Step 809: When $r_3'=r_3$, the processing proceeds to a step 810, and if otherwise, proceeds to a step 812.
Step 810: Signal "authenticated" is outputted.
Step 811: The third elliptic point ($x_3$, $y_3$) is outputted, whereon the processing proceeds to a step 813.
Step 812: Signal "not authenticated" is outputted.
Step 813: The processing comes to an end.

Through the processing described above, it is confirmed whether or not the triple digital signature ($r_1$, $r_2$, $r_3$, $s_3$) is a correct signature, i.e., whether or not the triple digital signature ($r_1$, $r_2$, $r_3$, $s_3$) corresponds to the correct or true seal image. More specifically, upon reception of the message $M_1$, the message $M_2$, the message M3 and the triple digital signature ($r_1$, $r_2$, $r_3$, $s_3$)), the user D can check to confirm whether or not the digital signatures have been made by the very users A, B and C by referencing the public keys $Q_1$, $Q_2$ and $Q_3$ which correspond to the registered seals ("hanko") of the users A, B and C, respectively.

The above-mentioned digital signature generation/verification method can be expanded to the case where N is equal to or greater than "4" (four). In other words, in general, a digital signature generating/verifying method for verifying electronically a multiple digital signature affixed to messages and/or comments $M_1$ created and/or added by N users ($i=1, \ldots, N$) can be carried out in general as follows:

Procedure for Verifying Multiple Digital Signature
by Users i ($2 \leq i \leq N$)

Step 901: Processing is started.
Step 902: The (i−1) messages or comments $M_1, \ldots, M_{i-1}$ and the (i−1)-tuple digital signature ($r_1, \ldots, r_{i-1}, s_{i-1}$) issued by an immediately preceding user (i−1) are received.

Step 903: Computation of a hash value $e_k=H(M_k)$ is repeated for the user (i−1) starting from k=1.
Step 904: Public keys $Q_k$ previously generated for satisfying $Q_k=d_kP$ and registered are inputted repetitionally for the user (i−1) starting from k=1.
Step 905: A point $(x_{i-1}, y_{i-1})$ on the elliptic curve given by the following expression (5) is computed.

$$(x_{i-1}, y_{i-1}) = s_{i-1}P - \sum_{k=1}^{i-1}\left(e_k + \sum_{M=1}^{k} r_m\right)Q_k$$

Step 906: A hash value $r_{i-1}'=h(x_{i-1})$ is computed.
Step 907: When $r_{i-1}=r_{i-1}'$, then data or signal indicating "authenticated" is issued.
Step 908: Point $(x_{i-1}, y_{i-1})$ on the elliptic curve is outputted, whereon the processing proceeds to a step 910.
Step 909: If $r_{i-1} \circ r_{i-1}'$, data indicating "not-authenticated" is issued.
Step 910: The processing comes to an end.

In other words, the digital signature generation/verification method for generating electronically the multiple digital signature affixed to messages and/or comments (i.e., document) $M_i$ created or added by N users (i=1, . . . , N) can be performed as follows:

Generation Procedure of Multiple Digital Signature by Users i (2≦i≦N)

Step 1001: Processing is started.
Step 1002: The point $(x_{i-1}, y_{i-1})$ obtained at the step 908 is inputted.
Step 1003: A hash value $e_i=H(M_i)$ is computed.
Step 1004: A random number $k_i$ is generated.
Step 1005: Point $k_iP=(x, y)$ is computed.
Step 1006: Point $(x_i, y_i)=(x_{i-1}, y_{i-1})+(x, y)$ are computed.
Step 1007: A hash value $r_i=h(x_i)$ is computed.
Step 1008: By using private keys $d_i$, the tally $s_i$ given by the following expression is determined.

$$s_i = s_{i-1} + k_i + d_i\left(e_i + \sum_{k=1}^{i} r_k\right) \pmod{n}$$

Step 1009: A set of the numerical values $(r_1, \ldots, r_i, \ldots, s_i)$ is outputted as the digital signature.

The embodiments of the invention described by reference to FIGS. 3 to 5 are directed to the multiple digital signature realized by making use of the addition defined on the elliptic curve. However, in general, such multiple digital signature can equally be realized by resorting to binary operation defined on the abelian group.

By way of example, in a set $Z_n$ of integers from "1" to "n−1" (where n represents a large prime number on the order of 1,000 bits), multiplication is defined in the world of modulo n. Then, $Z_n$ represents an abelian group. The base point P (1<P<n) is selected appropriately with the private key d and the public key Q being so selected that the following relation can apply valid:

$$Q=P^d \pmod{n} \quad (1)$$

In conjunction with the above expression (1), it is noted that the problem of determining d for given values of Q, P and n represents a discrete logarithm problem which is difficult to solve in view of the computational overhead when the value of n̲ is large.

On the presumption mentioned above, the single digital signature generation algorithm ($AL_1$) 105 described previously by reference to FIG. 2, for example, is modified as follows:

Single Digital Signatures Generation Algorithm ($AL_1$)

Step 201: The processing is started.
Step 202: The user A's created document $M_1$, the base point P and the private key d1 are inputted.
Step 203: A random number or integer $k_1$ of $l_H$ bits is generated.
Step 204: Computation is performed for determining $x_1=P^{k_1}$.
Step 205: A hash value $r_1=h(x_1)$ of $l_H/2$ bits is computed.
Step 206: A hash value $e_1=H(M_1)$ of $l_H$ bits is computed.
Step 207: Computation is performed for determining the tally $s_1=k_1+d_1(e_1+r_1) \pmod{n}$.
Step 208: Value of the single digital signature $(r_1, s_1)$ is outputted.
Step 209: The processing comes to an end.

The single digital signature $(r_1, s_1)$ obtained, being modified as mentioned above, brings about advantageous effects similar to those obtained in the digital signature generating/verifying method described hereinbefore by reference to FIG. 2. Similar modification of the multiple digital signatures can provide similar advantages as those mentioned hereinbefore.

With the arrangements of the digital signature generating/verifying systems described above, there can be assured such advantageous effects as mentioned below.

(1) It is impossible to forge a digital signature of other person without knowing the other person's private key. Security concerning the forgery prevention of the single digital signature $(r_1, s_1)$ will be demonstrated by the proposition 1 described hereinafter.

(2) The length of the digital signature can be shortened. By way of example, assuming that the order n is 160 bits and that the length of the output value of the total hash function H is 160 bits, then the length of the single digital signature in the conventional system is 240 bits. By contrast, in the case of the systems according to the invention, the length of the single digital signature is 240 bits. Furthermore, the length of the duple digital signature in the conventional system is 640 bits, whereas in the systems according to the invention, it is only 320 bits. In general, in the case where the N-tuple digital signature is affixed, the total length of the digital signatures is of 320×N bits, whereas in the system according to the present invention, it is 160+80×N bits. Thus, when the value of N is large, the length of the digital signature according to the invention can be reduced by ca. ¼ when compared with the signature length in the conventional system. In other words, the length of the digital signature can be significantly reduced according to the teachings of the invention.

(3) According to the invention, it is possible to make the length of the digital signature be independent of the length of the order n̲. Assuming now that the length of the output of the total hash function H is sufficiently greater than that of the random integer k̲, the length of the tally s̲ of the signature can be suppressed smaller than the length of the outputs of the total hash function H plus the length of the private key d̲. Thus, independent of the length of the order n̲, the length of the N-tuple digital signatures can be made to be not greater than "the length of the output of the whole hash function H+private key d̲+N×length of the output of the half-hash function h".

In each of the digital signature generation/verification system according to the embodiment of the invention described above, the processing steps of executing the digital signature generating method can be stored in the form of a programs in a recording medium such as a CD-ROM, a floppy-disk, a semiconductor memory or the like, wherein the program can be loaded and executed in a computer for generating the digital signature for thereby generating the digital signature. Similarly, the processing steps included in the input digital signature verifying method can be loaded in the computer for the digital signature verification in the form of a program to be executed for verifying the digital signature. Needless to say, the digital signature generating/verifying program mentioned above may be down-loaded to client personal computers from the server computer.

Lemma (Subsidiary Proposition) 1

It is presumed that H represents a hash function having a one-way property, the algorithm AL is not difficult to execute in view of the computational overhead and that data generated without resorting to the use of the hash function is inputted to thereby generate on a memory in the course of computation the numerical values of $\underline{x}$ and $\underline{y}$ which satisfy the equation "y=H(x)". In that presumed case, the numerical value $\underline{y}$ can never make appearance on the memory so long as the numerical value $\underline{x}$ has not made appearance ever on the memory in the past.

Demonstration

Demonstration will be made by resorting to "reductio ad absurdum (reduction to absurdity)" or irrationality. It is assumed that the value $\underline{y}$ satisfying the function y=H(x) has made appearance on the memory in precedence to the value $\underline{x}$. However, since the hash function H is of the one-way property, computation for the reverse transformation of the hash function H, i.e., $x=H^{-1}(y)$ is impossible. Accordingly, in order to generate the value $\underline{x}$ on the memory, it is necessary to supply externally such input data from which the value $\underline{x}$ capable of satisfying the hash function y=H(x), which however contradicts to the inputting of the data generated without using the hash function H.

The Demonstration of the lemma 1 is now concluded.

Proposition 1

It is presumed that the discrete logarithm problem concerning the addition on the elliptic curve can not be solved. Additionally, it is assumed that the hash function H(•) of $l_H$ bits has collision-free property as well as the one-way property. Furthermore, it is presumed that the hash function h(•) of $l_H/2$ bits has also the one-way property. In that case, when $l_n \geq l_H$, there exists no algorithm $AL_3$ which can output in response to the inputting of the base point (system key) P and the public key $Q_1$ the message $M_1$ and the single digital signature $(r_1, s_1)$ for which the algorithm $AL_1$ outputs "authenticate" so long as the private key $d_1$ is unknown.

Demonstration

Now, it is supposed that such algorithm $AL_3$ exists which can output in response to the inputted system key or base point P and the public key $Q_1$, the message $M_1$ and the single digital signature $(r_1, s_1)$ for which the verification processing $AL_1'$ outputs "authenticate" without knowing the private key $d_1$. More specifically, it is supposed that such algorithm $AL_3$ exists for which the inputs and the outputs are as follows:
Input to the algorithm $AL_3$: system key (base point) P, and public key $Q_1$
Output from the algorithm $AL_3$: message $M_1$, single digital signature $(r_1, s_1)$ where the message $M_1$ and the single digital signature $(r_1, s_1)$ satisfy the following conditions:

$$(x_1, y_1) = s_1 P - (e_1 + r_1) Q_1 \quad (2)$$

$$r_1 = h(x_1) \quad (3)$$

$$e_1 = H(M_1) \quad (4)$$

It should be noted that $l_n \geq l_H$ holds true.

On the conditions mentioned above, the number of the outputs from the algorithm $AL_3$ is three, i.e., $M_1$, $s_1$ and $r_1$. Accordingly, in the course of the processing according to the algorithm $AL_3$, the correct output values make appearance in either one of the orders or sequences mentioned below: Case 1: Correct output values make appearance in the sequence of $s_1$, $r_1$ and $M_1$. Case 2: Correct output values make appearance in the sequence of $r_1$, $s_1$ and $M_1$. Case 3: Correct output values make appearance in the sequence of $s_1$, $M_1$ and $r_1$. Case 4: Correct output values make appearance in the sequence of $M_1$, $s_1$ and $r_1$. Case 5: Correct output values make appearance in the sequence of $r_1$, $M_1$ and $s_1$. Case 6: Correct output values make appearance in the sequence of $M_1$, $r_1$ and $s_1$.

In the cases 1 and 2 mentioned above, the correct output values of $s_1$ and $r_1$ make appearance in precedence with the correct value of the message $M_1$ making no appearance at a given time point in the course of the processing. Since $\underline{h}$ in the expression (3) represents the hash function, the correct output value of the tally $x_1$ must make appearance in precedence to that of the tally $r_1$ in the light of the "Lemma 1" stated previously. When the value of the tally $x_1$ is determined the value of the tally $y_1$ assumes either one of two values $\pm \beta$ because the term $(x_1, y_1)$ in the expression (2) represents a point on the elliptic curve E. In correspondence to the value $+\beta$ or $-\beta$ of the tally $y_1$, the hash value $e_1$ which can satisfy the condition given by the expression (2) is limited to two different values. After the time point of concern, the message $M_1$ satisfying the condition given by the expression (4) so that the hash value $e_1$ assumes either one of the two value must be determined, which however contradicts to the fact that "H" in the expression (4) represents the hash function. Accordingly, the situations corresponding to the Cases 1 and 2 can not take place.

In the Cases 3 and 4 mentioned above, the correct output value of $s_1$ and the message $M_1$ make appearance in precedence with the correct value of the correct output value $r_1$ making no appearance at a given time point in the course of the processing. At this time point, the hash value $e_1$ can be determined definitely in accordance with the expression (4). After this time point, the value of the tally $r_1$ satisfying the conditions given by the expressions (2) and (3) must be determined. However, it will never occur that the correct output value of the tally $r_1$ makes appearance at first, being followed by determination of the value for the coordinate x1. This is because "h" in the expression (3) represents the hash function. Besides, such case will not occur in which the correct output value of $x_1$ makes appearance in precedence and thereafter the value of $r_1$ is determined. Because, if otherwise, the discrete logarithm problem concerning the addition on the ellipse can be solved in conjunction with the expression (2), which contradicts the proposition stated hereinbefore. In other words, the value of $r_1$ can not be determined at any time point. Thus, the situations corresponding to the Cases 3 and 4 can not occur.

In the Cases 5 and 6 mentioned above, the correct output values of the tally $r_1$ and the message $M_1$ make appearance in precedence with the correct value of the tally $s_1$ making no appearance at a given time point in the course of the processing. At this given time point, the hash value $e_1$ can be determined definitely in accordance with the expression (4). After this time point, the value of the tally $s_1$ satisfying the conditions given by the expressions (2) and (3) must be determined. However, it will never occur that the correct output value of the tally $s_1$ makes appearance at first, being then followed by determination of the value for the coordinate $x_1$. This is because "h" in the expression (3) represents the hash function and the correct output value of $x_1$ can make appearance before the output value of $r_1$ is determined precedingly. Besides, such case will not occur in which the correct output value of $x_1$ makes appearance in precedence and thereafter the value of $s_1$ is determined. Because, if otherwise, the expression (2) can be solved concerning the unknown $s_1$, that is, the discrete logarithm problem concerning the addition on the ellipse can be solved, which contradicts however the proposition stated hereinbefore. In other words, the value of $s_1$ can not be determined at any time point. Thus, the situations corresponding to the Cases 5 and 6 can not occur.

Thus, there occurs none of the situations corresponding to the Cases 1 to 6 mentioned previously. Thus, the algorithm $AL_3$ does not exist.

Now, the demonstration is concluded.

By the way, it should be noted that in conjunction with the demonstration of the Proposition 1 that the algorithm $AL_3$ may exist unless the Proposition 1 that $l_n \geq l_H$ applies valid.

To say in another way, if the condition $l_n < l_H$ should hold true, there may arise such situation that the message $M_1$ and the single digital signature $(r_1, s_1)$ for which the single digital signature verifying algorithm $AL_1'$ outputs "authenticated" can be generated without knowing the private key $\underline{d}$.

By way of example, let's suppose that in the computation "s=k+d(r+e) (mod n)", the value of $l_n$ is small and hence the value of $\underline{n}$ is small. Then, the collision-free property of hash value $\underline{e}$=H(M) (mod n) may collapse, incurring such case where computation is performed such that the tally $\underline{s}$ can assume a same value for messages M and M' notwithstanding of the fact that the message M is not same as the message M', i.e., M≠M', as exemplified below.

Let's suppose, by way of example, that the messages M and M' are written applications for purchasing a car.
Message M
To FT J#&•GH Sales Company
   I will purchase the car A at 1,050,000 yens.
      To be signed by Takaragi
Message M'
To IG#. Hy8(Jk) Sales Company
   I will purchase the car A at 2,050,000 yens.
      To be signed by Takaragi Again suppose that the malicious sales company prepared the written application for purchase such as the message M and handed it over to Mr. Takaragi under the false pretense that the leading character string "FT J#•GH" is added for the purpose of ensuring security and that Mr. Takaragi signed the written application (message M) with pleasure because of low price of the car A. Later on, Mr. Takaragi receives a bill demanding payment of 2,050,000 yens together with the exhibit of the message M' affixed with his signature, to his great surprise. However, verification of the message M' shows that Mr. Takaragi has signed the written application or message M'.

In order to exclude positively the injustice such as mentioned above, it is necessary that H represents the hash function which has not only the one-way property but also the collision-free property and that the parameter $\underline{n}$ relevant to the elliptic curve relation is assigned with a large value for validating the condition that $l_n \geq l_H$.

It should be additionally mentioned in conjunction with the "Demonstration" described above that the hash function $\underline{h}$ may be only of the one-way property and need not necessarily have the collision-free property. However, in case the hash function $\underline{h}$ is not of the one-way property, the values which can satisfy the condition given by the expression (3) may be found by arithmetically determining a variety of values for $\underline{x}$ by changing $\underline{s}$ and M while fixing $\underline{r}$ in the expression (2). The message M and the signature (s, r) found in this way may constitute forged message and signature. For this reason, it is necessarily required that the hash function $\underline{h}$ is of the one-way property.

Moreover, according to the teaching of the invention, the length of the digital signature can be shortened.

More specifically, the single digital signature $(r_1, s_1)$ has a bit length equal to $l_n+l_H/2$ (e.g. 240 bits), and thus the length of the signature can be shortened when compared with the conventional signature length $l_n+l_n$ (e.g. 320 bits). Furthermore, the length of the duple digital signature $(r_1, r_2, s_2)$ is $(l_n+l_H/2+l_H/2)$ bits (e.g. 320 bits), which is significantly shorter than the length of the conventional signature $l_n+l_n+l_n$ (e.g. 480 bits).

Proposition 2

It is presumed that the discrete logarithm problem concerning the addition on the elliptic curve can not be solved. Additionally, it is assumed that the hash function H(•) of $l_H$ bits has the collision-free property as well as the one-way property. Furthermore, it is presumed that the hash function h(•) of $l_H/2$ bits has the one-way property as well. In that case, so long as $l_n \geq l_H$, there exists no algorithm $AL_4$ which can output the duple digital signature $(r_1, r_2, s_2)$ for which the algorithm $AL_2$ outputs "authenticated" without knowing the private key $d_1$.

Demonstration

Now, it is supposed that such algorithm $AL_4$ exists which generates the duple digital signature $(r_1, r_2, s_2)$ for which the verification processing according to the algorithm $AL_2'$ outputs "authenticated" without knowing both the private key $d_1$ and the private key $d_2$. Namely, presumption is made as follows:

Input to the processing $AL_4$: system key (base point) P, and public keys $Q_1$ and $Q_2$, and
Output from the processing $AL_4$: messages $M_1$ and $M_2$, duple digital signature $(r_1, r_2, s_2)$,
where the duple digital signature $(r_1, r_2, s_2)$ satisfies the following conditions:

$$e_1 = H(M_1) \quad (4)$$

$$e_2 = H(M_2) \quad (5)$$

$$(x_2, y_2) = s_2 P - (e_1+r_1)Q_1 - (e_2+r_1+r_2)Q_2 \quad (6)$$

$$r_2 = h(x_2) \quad (7)$$

In the course of executing the processing according to the algorithm $AL_4$, the correct output values make appearance in either one of the sequences mentioned below: Case 1: Correct output values make appearance in the sequence of $s_2$, $r_1$ and $r_2$. Case 2: Correct output values make appearance in the sequence of $r_1$, $s_2$ and $r_2$. Case 3: Correct output values make appearance in the sequence of $s_2$, $r_2$ and $r_1$. Case 4: Correct output values make appearance in the sequence of $r_2$, $s_2$ and $r_1$. Case 5: Correct output values make appearance in the sequence of $r_1$, $r_2$ and $s_2$. Case 6: Correct output values make appearance in the sequence of $r_2$, $r_1$ and $s_2$.

In conjunction with the Case 1 to 6 mentioned above, it is noted that the computation sequence that the correct output value of the tally $r_2$ is determined in accordance with the expression (7) only after the correct output value of the coordinate $\underline{x}$ has made appearance is common to all the Case 1 to 6. If otherwise, it contradicts the presumption that the hash function $\underline{h}$ is of the one-way property.

Additionally, the computation sequence that the hash values $e_1$ and $e_2$ are determined in accordance with the expressions (4) and (5), respectively, only after the correct output values of the messages $M_1$ and $M_2$ have made appearance is also common to the all the aforementioned Cases 1 to 6. If otherwise, it contradicts the presumption that the hash function H is of the one-way property and collision-free.

In the Cases 1 and 2, the correct output values of the tallies $s_2$ and $r_1$ make appearance at first at a given time point in the course of executing the processing whereas the correct output value of the tally $r_2$ makes no appearance. After the above-mentioned given time point, the tally $r_2$ which satisfies the condition given by the expression (6) must be determined. In this conjunction, however, the following facts (a), (b) and (c) have to be taken into account.

(a) Such situation does not occur in which the correct output value of the tally $r_2$ makes appearance finally after the appearance of the correct hash values $e_1$ and $e_2$. More specifically, the computation sequence in this case will be such that the value of the coordinate $x_2$ is determined and then the tally $r_2$ determined. However, this means that the equation (6) can be solved with the tally $r_2$ as the unknown, which contradicts the presumption that the discrete logarithm problem on the elliptic curve is insolvable.

(b) Such situation can not occur that the correct hash value $e_2$ is outputted only after the appearance of the correct output values for the hash value $e_1$ and the tally $r_2$, because, if otherwise, the equation (6) is solved with the hash value $e_2$ as the unknown, which contradicts the presumption that the discrete logarithm problem on the elliptic curve is insolvable.

(c) Such situation can not occur that the correct output value for the hash value $e_1$ makes appearance only after the appearance of the correct output voltages for the hash value $e_2$ and the tally $r_2$, because, if otherwise, the equation (6) is solved with the hash value $e_2$ as the unknown, which of course contradicts the presumption that the discrete logarithm problem on the elliptic curve is insolvable.

In the Cases 3 and 4, the correct output values of the tallies $s_2$, $r_2$ and $x_2$ make appearance at first at a given time point in the course of executing the processing, whereas the correct output value of the tally $r_2$ makes no appearance. After the above-mentioned given time point, the tally $r_1$ which satisfies the condition given by the expression (6) must be determined. Such situation does not occur in which the correct output value of the tally $r_1$ makes appearance finally after the appearance of the correct hash values $e_1$ and $e_2$. Supposing that the correct output value for the hash value $e_2$ makes appearance finally, then it follows:

(i) If the private keys $d_1$ and $d_2$ are known, the expression (6) can be modified as follows:

$$(x_2, y_2) = \{s_2 - d_1(e_1 + r_1)\}P - (e_2 + r_1 + r_2)Q_2 \quad (8)$$

The above equation (8) is solvable with a tally $r_1$ as the unknown, which of course contradicts the presumption that the discrete logarithm problem on the elliptic curve is insolvable.

(ii) If the private key $d_2$ is known with the private key $d_1$ being unknown, the expression (6) can be modified as follows:

$$(x_2, y_2) = \{s_2 - d_2(e_2 + r_1 + r_2)\}P - (e_1 + r_1)Q_1 \quad (9)$$

The above equation (9) is solvable with the tally $r_1$ as the unknown, which is in contradiction to the presumption that the discrete logarithm problem on the elliptic curve is solvable.

(iii) When neither the private key $d_2$ nor the private key $d_1$ is known, the equation (6) is solvable with the tally $r_1$ as the unknown, which is in contradiction to the presumed insolvability of the discrete logarithm problem on the elliptic curve.

In view of the foregoing, it can be concluded that the correct output value for the tally $r_1$ can not make appearance finally after the output of the correct hash values $e_1$ and $e_2$.

(b) Such situation can not occur that the correct output value for the hash value $e_1$ makes appearance only after the appearance of the correct output voltages for the hash value $e_1$ and the tally $r_1$, because, if otherwise, the equation (6) is solved with the hash value $e_1$ as the unknown, which of course contradicts the presumption that the discrete logarithm problem on the elliptic curve is insolvable.

(c) Such situation can not occur that the correct output value for the hash value $e_1$ makes appearance only after the appearance of the correct output voltages for the hash value $e_1$ and the tally $r_1$, because, if otherwise, the equation (6) is solved with the hash value $e_2$ as the unknown, which of course contradicts the presumption that the discrete logarithm problem on the elliptic curve is insolvable. Thus, Cases 3 and 4 can not occur.

In the Cases 5 and 6, the correct output values of the tallies $r_1$, $r_2$ and $x_2$ make appearance at first at a given time point in the course of executing the processing whereas the correct output value of the tally $s_2$ makes no appearance. After the above-mentioned given time point, the tally $s_2$ which satisfies the condition given by the expression (6) must be determined. In this conjunction, however, the following facts (a), (b) and (c) have to be taken into account. However, in that case, (a) such situation does not occur in which the correct output value of the tally $s_2$ makes appearance finally after the appearance of the correct hash values $e_1$ and $e_2$. Because, this means that the equation (6) can be solved with the tally $s_2$ as the unknown, which contradicts the presumption that the discrete logarithm problem on the elliptic curve is insolvable. Further, (b) such situation can not occur that the correct hash value $e_2$ is outputted only after the appearance of the correct output values for the hash value $e_1$ and the tally $s_2$, because, if otherwise, the equation (6) is solved with the hash value $e_2$ as the unknown, which contradicts the presumption that the discrete logarithm problem on the elliptic curve is insolvable. Furthermore, (c) such situation can not occur that the correct output value for the hash value $e_1$ makes appearance only after the appearance of the correct output voltages for the hash value $e_2$ and the tally $s_2$, because, if otherwise, the equation (6) is solved with the hash value $e_1$ as the unknown, which of course contradicts the presumption that the discrete logarithm problem on the elliptic curve is insolvable. Thus, Cases 5 and 6 can not occur.

From the foregoing, it is concluded that none of the Cases 1 to 6 can occur and thus the algorithm $AL_4$ does not exist.

Now, the demonstration is concluded.

As will now be appreciated from the foregoing description, there have been provided a public key encryption method of high security and a system for carrying out the same.

Further, with the public key encryption method and the system according to the invention, the length of the digital signature can be shortened.

Additionally, according to the present invention, the public key encryption method and the system can be so realized that the length of the digital signature has no dependency on the length of the order of the base point (system key).

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A digital signature generating method for generating a digital signature authenticating electronically a signature affixed to a given message, M, by resorting to a public key encryption scheme, comprising the steps of:

determining for said message, M, a first hash value, e, satisfying a condition that e=H(M) by using a first hash function, H;

determining for a numerical value, x, obtained from translation of a random number and independent of said message, a second hash value, r, satisfying a condition that r=h(x) by using a second hash function, h, whose output value is shorter than that of said first hash function, H, said second hash value being independent of said message; and arithmetically determining and outputting said digital signature by using said first hash value, e, and said second hash value, r, as determined.

2. A digital signature generating method according to claim 1, wherein for generating a digital signature $(r_1, s_1)$ for a given message, $M_1$, said method comprises the steps of:

determining a hash value, $e_1$, satisfying a condition that $e_1=H(M_1)$ by using said first hash function, H;

generating a random number, $k_1$;

determining an element, $R_1$, by multiplying an element, P, of an abelian group by said random number, $k_1$;

determining a first numerical value, $r_1$, satisfying a condition that $r_1=h(R_1)$ by using the second hash function, h, whose output value is shorter than the output value of the first hash function, H;

determining a second numerical value, $s_1$, satisfying a condition that $s_1=k_1+d_1(e_1+r_1)$ (mod n) by using the order, n, of said element, P, of said abelian group and a private key, $d_1$; and outputting a set of said determined numerical values $(r_1, s_1)$ as a digital signature.

3. A digital signature generating method according to claim 2, wherein said element, P, of said abelian group corresponds to a point, P, on an elliptic curve.

4. A digital signature verifying method for verifying a digital signature authenticating electronically a signature affixed to a given message, M, by resorting to a public key encryption scheme, comprising the steps of:

determining for said message, M, a first hash value, e, satisfying a condition that e=H(M) by using a first hash function, H;

determining a second hash value, r', from a numerical value, x, said numerical value, x, being obtained from arithmetic operation of an inputted digital signature (r, s), a public key, Q, and an element, P, and which has been selected independently, said second hash value, r', satisfying a condition that r'=h(x) from said first hash value, e, said digital signature (r, s), said element, P, and said public key, Q, by using a second hash function, h, whose output value is shorter than that of said first hash function, H, said second hash valve being independent of said message; and comparing said second hash value, r', with a tally, r, of said inputted digital signature to thereby obtain a result of verification of said inputted digital signature.

5. A digital signature verifying method according to claim 4, wherein for verifying a digital signature $(r_1, s_1)$ of a given message, $M_1$, said method comprises the steps of:

determining a hash value, $e_1$, satisfying a condition that $e_1=H(M_1)$;

inputting a public key, $Q_1$, generated previously so as to satisfy a condition $Q_1=d_1P$, where $d_1$ represents a private key, said public key, $Q_1$, having been registered;

determining arithmetically a point, $R_1$, of an abelian group, said point, $R_1$, being given by $R_1=s_1P-(e_1+r_1)Q_1$;

determining a hash value, $r_1'$, satisfying a condition that $r_1'=h(R_1)$;

outputting a data indicating that said digital signature is authenticated, when said hash value, $r_1'$, coincides with said tally, r, of said digital signature; and outputting a data indicating that said digital signature is not authenticated unless said hash value, $r_1'$, coincides with said tally, $r_1$, of said digital signature.

6. A digital signature verifying method according to claim 5, wherein said abelian group includes an elliptic curve.

7. A digital signature generating method for generating a multiple digital signature authenticating electronically signatures affixed to messages and/or comments, $M_i$, as created and/or added sequentially by N users i (where i=1, . . . , N) by using a public key encryption scheme, comprising the steps of:

(a) determining for a given one of said messages, $M_i$, a first hash value, $e_i$, satisfying a condition that $e_i=H(M_i)$ by using a first hash function, H;

(b) determining for a numerical value, $x_i$, obtained from translation of a random number and independent of said message a second hash value, $r_i$, satisfying a condition that $r_i=h(x_i)$ by using a second hash function, h, whose output value is shorter than that of said first hash function, H, wherein the value $r_i$ is part of data configuring a digital signature, said second hash valve being independent of said message;

(c) executing said steps (a) and (b) for each of said users i (where i=1, . . . , N); and (d) determining arithmetically said multiple digital signatures on the basis of the hash values ($e_i$ and $r_i$) determined in said step (c).

8. A multiple digital signature generating method according to claim 7, wherein for generating said multiple digital signature by user i (i≧2), said method comprises the steps of:

inputting a set of numeric values $(x_{i-1}, y_{i-1})$ obtained from translation of random numbers;

computing a hash value $e_i=H(M_i)$;

generating a random number $k_i$;

computing a point $k_iP=(x, y)$;

computing a point $(x_i, y_i)=(x_{i-1}, y_{i-1})+(x, y)$;

computing a hash value $r_i=h(x_i)$;

determining by using a private key, $d_i$, a tally, $s_i$, satisfying a condition given by the following expression:

$$s_i = s_{i-1} + k_i + d_i \left( e_i + \sum_{k=i}^{i} r_k \right) \pmod{n};$$

and outputting a set of numerical values $(r_1, \ldots, r_i, s_i)$ as said multiple digital signature, wherein the value $s_i$ is part of data configuring a digital signature.

9. A multiple digital signature verifying method according to claim 7, wherein for generating a multiple digital signature by users i ($i \geq 2$), said method comprises the steps of:

inputting (i−1) messages and/or comments ($M_1, \ldots M_{i-1}$) and (i−1)-tuple digital signature ($r_i, \ldots, r_{i-1}, s_{i-1}$) issued by an immediately preceding user (i−1);

repeating computation of hash values $e_k = H(M_k)$, where k represents 1 to (i−1);

inputting repetitionally public keys $Q_k$ generated so as to satisfy a condition that $Q_k = d_k P$, where k represents 1 to (i−1);

computing an element ($R_{i-1}$) of an abelian group in accordance with $$(R_{i-1}) = S_{i-1}P - \sum_{k=1}^{i-1} \left( e_k + \sum_{M=1}^{k} r_m \right)_{Q^k};$$

computing a hash value $(r'_{i-1} = h(R_{i-1})$;

issuing data indicating "authenticated" when said hash value, $r_{i-1}'$, coincides with a tally, $r_{i-1}$, of said (i−1)-tuple digital signature; and issuing data indicating "not-authenticated" unless said hash value, $r_{i-1}'$, coincides with said tally, $r_{i-1}$.

10. A digital signature verifying method according to claim 9, wherein said abelian group includes an elliptic curve.

11. A digital signature verifying method for verifying a multiple digital signature authenticating electronically signatures affixed to messages and/or comments, $M_i$, as created and/or added sequentially by N users i (where i=1, ..., N) by resorting to a public key encryption scheme, comprising the steps of:

(a) determining for the inputted message, $M_i$, a first hash value, $e_i$, satisfying a condition that $e_i = H(M_i)$ by using a first hash function, H;

(b) determining for a numerical value, $x_i$, obtained by arithmetic operation of an inputted multiple digital signature ($r_i, s_i$), a public key, Q, and an element, P, and independent of said message, a second hash value, $r_i'$, satisfying a condition that $r_i' = h(x_i)$ on the basis of said first hash value, $e_i$, said digital signature ($r_i, s_i$), said element, P, and said public key, Q, by using a second hash function, h, whose output value is shorter than that of said first hash function, H, said second hash value being independent of said message;

(c) executing said steps (a) and (b) for each of said users i (where i represents integers "1" to "N" inclusive, respectively); and (d) comparing each of said hash values, $r_i'$, determined in said step (c) with each of said tallies, r, of said inputted multiple digital signature to thereby obtain results of verification of said inputted digital signature.

12. A digital signature generating system for generating a digital signature authenticating electronically a signature affixed to a given message, M, by resorting to a public key encryption scheme, comprising:

processing means for determining for said message, M, a first hash value, e, satisfying a condition that e=H(M) by using a first hash function, H;

processing means for determining for a numerical value, x, obtained from translation of a random number and independent of said message, a second hash value, r, satisfying a condition that r=h(x) by using a second hash function, h, whose output value is shorter than that of said first hash function, H, said second hash value being independent of said message; and arithmetic/output means for arithmetically determining and outputting said digital signature by using said first hash value, e, and said second hash value, r, as determined.

13. A digital signature generating system according to claim 12, wherein for generating a digital signature ($r_1, s_1$) for a given message, $M_1$, said system comprises:

means for determining a hash value, $e_1$, satisfying a condition that $e_1 = H(M_1)$ by using the first hash function, H;

means for generating a random number, $k_1$;

means for determining an element, $R_1$, by multiplying an element P, of the abelian group by said random number, $k_1$;

means for determining a first numerical value, $r_1$, satisfying a condition that $r_1 = h(R_1)$ by using the second hash function, h, whose output value is shorter than that of said first hash function, H;

means for determining a second numerical value, $s_1$, satisfying a condition that $s_1 = k_1 + d_1(e_1 + r_1) \pmod{n}$ by using order, $n_1$, of said element, P, of the abelian group and a private key, $d_1$; and means for outputting a set of said determined numerical values ($r_1, s_1$) as a digital signature.

14. A digital signature verifying system according to claim 13, wherein said abelian group corresponds to an elliptic curve.

15. A digital signature verifying system for verifying a digital signature authenticating electronically a signature affixed to a given message, M, by resorting to a public key encryption scheme, comprising:

first arithmetic means for determining for said given message, M, a first hash value, e, satisfying a condition that e=H(M) by using a first hash function, H;

second arithmetic means coupled to said first arithmetic means for determining for a numerical value, x, obtained from arithmetic operation of an inputted digital signature (r, s), a public key, Q, and a base point, P, and independent of said message, a second hash value, r', satisfying a condition that r'=h(x) from said first hash value, e, said digital signature (r, s), said base point, P, and said public key, Q, by using a second hash function, h, whose output value is shorter than that of said first hash function, H, said second hash value being independent of said message; and verification result output means coupled to said first and second arithmetic means for comparing said hash value, r', with a tally, r, of said inputted digital signature to thereby obtain a result of verification of said inputted digital signature.

16. A digital signature verifying system according to claim 15, wherein for verifying a digital signature $(r_1, s_1)$ of a given message, $M_1$, said system comprises:

means for determining a hash value, $e_1$, satisfying a condition that $e_1=H(M_1)$;

means for inputting a public key, $Q_1$, generated previously so as to satisfy a condition $Q_1=d_1P$, where $d_1$ represents a private key, said public key, $Q_1$, having been registered;

means for determining arithmetically an element, $R_1$, of an abelian group, said element, $R_1$, being given by $R_1=s_1P-(e_1+r_1)Q_1$;

means for determining a hash value, $r_1'$, satisfying a condition that $r_1'=h(R_1)$;

means for outputting a data indicating that said digital signature is authenticated, when said hash value, $r_1'$, coincides with a tally, $r_1$, of said digital signature; and means for outputting a data indicating that said digital signature is not authenticated, unless said hash value, $r_1'$, coincides with said tally, $r_1$, of said digital signature.

17. A digital signature verifying system according to claim 16, wherein said abelian group includes an elliptic curve.

18. A digital signature generating system for generating a multiple digital signature authenticating electronically signatures affixed to message and/or comments, $M_i$, as created and/or added sequentially by N users' units i (where i=1, . . . , N) by using a public key encryption scheme, comprising:

first processing means for determining for a given one of said messages, $M_i$, a first hash value, $e_i$, satisfying a condition that $e=H(M_1)$ by using a first hash function, H;

second processing means for determining for a numerical value, $x_i$, obtained from translation of a random number and independent of said message a second hash value, $r_i$, satisfying a condition that $r_i=h(x_i)$ by using a second hash function, h, whose output value is shorter than that of said first hash function, H, second hash value being independent of said message;

third processing means for executing the processings of said first and second processing means for each of said users' units i (where i=1, . . . , N); and arithmetic/output means for determining arithmetically said multiple digital signature on the basis of said hash values ($e_i$ and $r_i$) determined by said third processing means.

19. A multiple digital signature generating system according to claim 18, wherein for generating said multiple digital signature, each of said users' units i (i≧2) includes:

means for inputting said set of numerical values ($x_{i-1}$, $y_{i-1}$) obtained from the translation of random numbers;

means for computing a hash value given by $e_1=H(M_i)$;

means for generating a random number $k_i$;

means for computing a point given by $k_1P=(x, y)$;

means for computing a point given by $(x_1, y_1)=(x_{i-1}, y_{i-1})+(x, y)$;

means for computing a hash value given by $r_1=h(x_i)$;

means for determining a numerical value, s, by using a private key, $d_i$, said numerical value, $s_i$, satisfying a condition given by $$s_i = s_{i-1} + k_i + d_i \left( e_i + \sum_{k=i}^{i} r_k \right) (mod\ n);$$

and means for outputting a set of determined numerical values $(r_1, \ldots, r_i, s_i)$ as the digital signature.

20. A digital signature verifying system for verifying a multiple digital signature authenticating electronically signatures affixed to messages and/or comments, $M_i$, as created and/or added sequentially by N users's unit i (where i=1, . . . , N) by resorting to a public key encryption scheme, comprising:

first arithmetic means for determining for the inputted message, $M_i$, a first hash value, $e_i$, satisfying a condition that $e_i=H(M_i)$ by using a first hash function, H;

second arithmetic means for determining for a numerical value, $x_i$, obtained by arithmetic operation of the inputted multiple digital signature $(r_i, s_i)$, a public key, Q, and a base point, P, and independent of said message, a second hash value, $r_i'$, satisfying a condition that $r_i'=h(x_i)$ on the basis of said first hash value, $e_i$, said digital signature $(r_i, s_i)$, said base point, P, and said public key, Q, by using a second hash function, h, whose output value is shorter than that of said first hash function, H, said second hash value being independent of said message;

processing means for executing repetitionally the arithmetic operation of said first and second arithmetic means for each of said users's units i (where i represents integers "1" to "N" inclusive, respectively); and verifying means for comparing each of said hash values, $r_i$, determined by said processing means with each of said tallies, r, of said inputted multiple digital signature to thereby obtain results of verification of said inputted digital signature.

21. A multiple signature verifying system according to claim 20, wherein for authenticating a multiple digital signature by users' units i (i≧2), each of said users' units includes:

means for inputting (i−1) messages and/or comments $(M_1, \ldots, M_{i-1})$ and (i−1)-tuple digital signature $(r_1, \ldots, r_{i-1}, s_{i-1})$ issued by an immediately preceding user's units (i−1);

means for repeating computation of hash values $e_k=H(M_k)$, where k represents 1 to (i−1);

means for inputting repetitionally public keys $Q_k$ generated so as to satisfy a condition that $Q_k=d_kP$, where k represents 1 to (i−1);

means for computing an element, $R_{i-1}$, of an abelian group in accordance with $$(R_{i-1}) = S_{i-1}P - \sum_{k=1}^{i-1} \left( e_k + \sum_{M=1}^{k} r_m \right)_{Q^k};$$

means for computing hash values $r_{i-1}'=h(R_{i-1})$;

means for issuing data indicating that said multiple digital signature is authenticated when said hash value, $r_{i-1}'$, coincides with a tally, $r_{i-1}$, of said (i−1)-tuple digital signature, and issuing data indicating that said multiple digital signature is not-authenticated unless said hash value, $r_{i-1}'$, coincides with said tally, $r_{i-1}$.

22. A digital signature verifying system according to claim 21, wherein said abelian group includes an elliptic curve.

23. A computer-readable recording medium for storing a program which is composed of instructions executed by a computer and which is for carrying out a method for generating a digital signature authenticating electronically a signature affixed to a given message, M, by resorting to a public key encryption scheme, said digital signature generating method comprising the steps of:

determining for said message, M, a first hash value, e, satisfying a condition that e=H(M) by using a first hash function, H;

determining for a numerical value, x, obtained from translation of a random number and independent of said message a second hash value, r, satisfying a condition that r=h(x) by using a second hash function, h, whose output value is shorter than that of said first hash function, H, said second hash value being independent of said message; and arithmetically determining and outputting said digital signature by using said first hash value, e, and said second hash value, r, as determined.

24. A computer-readable recording medium for storing a program which is composed of instructions executed by a computer and which is for carrying out a method for verifying a digital signature authenticating electronically a signature affixed to a given message, M, by resorting to a public key encryption scheme, said digital signature generating method comprising the steps of:

determining for said message, M, a first hash value, e, satisfying a condition that e=H(M) by using a first hash function, H;

determining for a numerical value, x, obtained from arithmetic operation of an inputted digital signature (r, s), a public key, Q, and a base point, P, and independent of said message, a second hash value, r', satisfying a condition that r'=h(x) on the basis of said first hash value, e, said digital signature(r, s), said base point, P, and said public key, Q, by using a second hash function, h, whose output value is shorter than that of said first hash function, H, said second hash value being independent of said message; and comparing said hash value, r', with a tally, r, of said inputted digital signature to thereby obtain a result of verification of said inputted digital signature.

25. A method of generating and verifying a digital signature using a public key encryption scheme in a system in which a digital signature is generated by a given one computer and transmitted via a network to another computer to be verified thereby, for generating a digital signature $(r_1, s_1)$ for a given message, $M_1$, by said given one computer, said method comprises:

determining a hash value, $e_1$, satisfying a condition that $e_1=H(M_1)$ by using a first hash function, H;

generating a random number, $k_1$;

determining a point, $R_1$, by multiplying an element, P, of an abelian group by said random number, $k_1$;

determining a first numerical value, $r_1$, satisfying a condition that $r_1=h(R_1)$ and being determined independent of said message by using a second hash function, h, whose output value is shorter than that of said first hash function, H, said first numerical value being independent of said message;

determining a second numerical value, $s_1$, satisfying a condition that $s_1=k_1+d_1(e_1+r_1)$ (mod n) on the basis of the order, n, of said element, P, of said abelian group and a private key, $d_1$; and sending a set of said determined numerical values $(r_1, s_1)$ as a digital signature to said another computer via said network; and for verifying said digital signature $(r_1, s_1)$ by said another computer, said method comprises:

fetching said digital signature $(r_1, s_1)$ sent from said given one computer, said element, P, a public key, Q, and order, n, from a public file;

determining a hash value, $e_1$, satisfying a condition that $e_1=H(M_1)$;

inputting a public key, $Q_1$, generated previously so as to satisfy a condition $Q_1=d_1P$, where $d_1$ represents a private key;

determining arithmetically a point, $R_1$, of an abelian group, said point, $R_1$, being given by $R_1=s_1P-(e_1+r_1)Q_1$;

determining a hash value, $r_1'$, satisfying a condition that $r_1'=h(R_1)$;

outputting a data indicating that said digital signature is authenticated, when said hash value, $r_1'$, coincides with a tally, r, of said digital signature; and outputting data indicating that said digital signature is not authenticated unless said hash value, $r_1'$, coincides with said tally, $r_1$, of said digital signature.

* * * * *